US012084200B2

(12) United States Patent
Peters et al.

(10) Patent No.: US 12,084,200 B2
(45) Date of Patent: Sep. 10, 2024

(54) GROUND STATE DETERMINATION SYSTEMS FOR AIRCRAFT

(71) Applicant: Textron Innovations Inc., Providence, RI (US)

(72) Inventors: Russell C. Peters, Fort Worth, TX (US); Aaron M. Hitchcock, Fort Worth, TX (US); Nathaniel Gordon Lundie, Dallas, TX (US)

(73) Assignee: Textron Innovations Inc., Providence, RI (US)

( * ) Notice: Subject to any disclaimer, the term of this patent is extended or adjusted under 35 U.S.C. 154(b) by 359 days.

(21) Appl. No.: 17/518,118

(22) Filed: Nov. 3, 2021

(65) Prior Publication Data

US 2023/0138684 A1    May 4, 2023

(51) Int. Cl.
*B64D 45/04* (2006.01)
*B64C 29/02* (2006.01)
*G05D 1/00* (2024.01)

(52) U.S. Cl.
CPC .............. *B64D 45/04* (2013.01); *B64C 29/02* (2013.01); *G05D 1/0638* (2013.01); *G05D 1/0676* (2013.01)

(58) Field of Classification Search
CPC ...... B64D 45/04; B64C 29/02; G05D 1/0638; G05D 1/0676; G01C 23/005; B64U 70/40
See application file for complete search history.

(56) References Cited

U.S. PATENT DOCUMENTS

| | | | |
|---|---|---|---|
| 1,655,113 A | 1/1928 | Nikola |
| 2,601,090 A | 6/1952 | James |
| 2,655,997 A | 10/1953 | Peterson |
| 2,688,843 A | 9/1954 | Pitt |
| 3,002,712 A | 10/1961 | Sterling |
| 3,081,964 A | 3/1963 | Quenzler |
| 3,181,810 A | 5/1965 | Olson |
| 3,259,343 A | 7/1966 | Roppel |
| 3,289,980 A | 12/1966 | Gardner |

(Continued)

FOREIGN PATENT DOCUMENTS

| CN | 105539833 A | 5/2016 |
|---|---|---|
| FR | 2977865 A3 | 1/2013 |

(Continued)

OTHER PUBLICATIONS

Air Launched Unmanned Disaster Relief Delivery Vehicle, 33rd Annual AHS Student Design Competition, University of Maryland, Undated but admitted prior art.

(Continued)

*Primary Examiner* — Marc Burgess
*Assistant Examiner* — Ashleigh Nicole Turnbaugh
(74) *Attorney, Agent, or Firm* — Lawrence Youst PLLC

(57) ABSTRACT

A ground state determination system for an aircraft includes sensors configured to detect parameters of the aircraft and a flight control system implementing a ground state module. The ground state module includes a ground state monitoring module configured to monitor the parameters and a ground state determination module configured to compare each of the parameters monitored by the ground state monitoring module to a respective parameter threshold to determine whether the aircraft is on a surface.

11 Claims, 13 Drawing Sheets

(56) References Cited

U.S. PATENT DOCUMENTS

| | | |
|---|---|---|
| 3,350,035 A | 10/1967 | Schlieben |
| 3,592,412 A | 7/1971 | Glatfelter |
| 3,618,875 A | 11/1971 | Kappus |
| 3,783,618 A | 1/1974 | Kawamura |
| 3,916,588 A | 11/1975 | Magill |
| 4,243,358 A | 1/1981 | Carlock et al. |
| 4,458,864 A | 7/1984 | Colombo et al. |
| 4,571,157 A | 2/1986 | Eickmann |
| 4,596,368 A | 6/1986 | Schmittle |
| 4,613,098 A | 9/1986 | Eickmann |
| 4,741,672 A | 5/1988 | Breuner |
| 4,771,967 A | 9/1988 | Geldbaugh |
| 4,913,377 A | 4/1990 | Eickmann |
| 4,925,131 A | 5/1990 | Eickmann |
| 5,131,605 A | 7/1992 | Kress |
| 5,188,512 A | 2/1993 | Thornton |
| 5,592,894 A | 1/1997 | Johnson |
| 5,842,667 A | 12/1998 | Jones |
| 6,086,015 A | 7/2000 | MacCready |
| 6,170,778 B1 | 1/2001 | Cycon et al. |
| 6,260,793 B1 | 7/2001 | Balayn et al. |
| 6,270,038 B1 | 8/2001 | Cycon et al. |
| 6,402,088 B1 | 6/2002 | Syrovy et al. |
| 6,655,631 B2 | 12/2003 | Austen-Brown |
| 6,845,939 B1 | 1/2005 | Baldwin |
| 6,886,776 B2 | 5/2005 | Wagner et al. |
| 6,892,980 B2 | 5/2005 | Kawai |
| 7,059,562 B2 | 6/2006 | Baldwin |
| 7,150,429 B2 | 12/2006 | Kusic |
| 7,210,654 B1 | 5/2007 | Cox et al. |
| 7,465,236 B2 | 12/2008 | Wagels |
| 7,472,863 B2 | 1/2009 | Pak |
| 7,555,893 B2 | 7/2009 | Okai et al. |
| 7,984,684 B2 | 7/2011 | Hinderks |
| 8,152,096 B2 | 4/2012 | Smith |
| 8,393,564 B2 | 3/2013 | Kroo |
| 8,505,846 B1 | 8/2013 | Sanders |
| 8,602,348 B2 | 12/2013 | Bryant |
| 8,646,720 B2 | 2/2014 | Shaw |
| 8,733,690 B2 | 5/2014 | Bevirt et al. |
| 8,800,912 B2 | 8/2014 | Oliver |
| 8,820,672 B2 | 9/2014 | Erben et al. |
| 8,833,692 B2 | 9/2014 | Yoeli |
| 8,909,391 B1 | 12/2014 | Peeters et al. |
| 8,948,935 B1 | 2/2015 | Peeters et al. |
| 9,022,312 B2 | 5/2015 | Kosheleff |
| 9,045,226 B2 | 6/2015 | Piasecki et al. |
| 9,087,451 B1 | 7/2015 | Jarrell |
| 9,108,744 B2 | 8/2015 | Takeuchi |
| 9,109,575 B2 | 8/2015 | Weddendorf et al. |
| 9,120,560 B1 | 9/2015 | Armer et al. |
| 9,127,908 B2 | 9/2015 | Miralles |
| 9,162,753 B1 | 10/2015 | Panto et al. |
| 9,187,174 B2 | 11/2015 | Shaw |
| 9,193,460 B2 | 11/2015 | Laudrain |
| 9,221,538 B2 | 12/2015 | Takahashi et al. |
| 9,242,714 B2 | 1/2016 | Wang et al. |
| 9,254,916 B2 | 2/2016 | Yang |
| 9,284,049 B1 | 3/2016 | Wang et al. |
| 9,321,530 B2 | 4/2016 | Wang et al. |
| 9,376,208 B1 | 6/2016 | Gentry |
| 9,388,794 B2 | 7/2016 | Weddendorf et al. |
| 9,403,593 B2 | 8/2016 | Downey et al. |
| 9,440,736 B2 | 9/2016 | Bitar |
| 9,463,875 B2 | 10/2016 | Abuelsaad et al. |
| 9,493,225 B2 | 11/2016 | Wang et al. |
| 9,610,817 B1 | 4/2017 | Piasecki et al. |
| 9,643,720 B2 | 5/2017 | Hesselbarth |
| 9,694,908 B2 | 7/2017 | Razroev |
| 9,694,911 B2 | 7/2017 | Bevirt et al. |
| 9,714,087 B2 | 7/2017 | Matsuda |
| 9,798,322 B2 | 10/2017 | Bachrach et al. |
| 9,800,091 B2 | 10/2017 | Nugent, Jr. et al. |
| 9,821,909 B2 | 11/2017 | Moshe |
| 9,963,228 B2 | 5/2018 | McCullough et al. |
| 9,994,313 B2 | 6/2018 | Claridge et al. |
| 10,011,351 B2 | 7/2018 | McCullough et al. |
| 10,124,890 B2 | 11/2018 | Sada-Salinas et al. |
| 10,183,746 B2 | 1/2019 | McCullough et al. |
| 10,214,285 B2 | 2/2019 | McCullough et al. |
| 10,220,944 B2 | 3/2019 | McCullough et al. |
| 10,227,133 B2 | 3/2019 | McCullough et al. |
| 10,232,950 B2 | 3/2019 | McCullough et al. |
| 10,301,016 B1 | 5/2019 | Bondarev et al. |
| 10,315,761 B2 | 6/2019 | McCullough et al. |
| 10,322,799 B2 | 6/2019 | McCullough et al. |
| 10,329,014 B2 | 6/2019 | McCullough et al. |
| 10,343,773 B1 | 7/2019 | McCullough et al. |
| 10,351,232 B2 | 7/2019 | McCullough et al. |
| 10,442,522 B2 | 10/2019 | Oldroyd et al. |
| 10,457,390 B2 | 10/2019 | McCullough et al. |
| 10,501,193 B2 | 12/2019 | Oldroyd et al. |
| 10,583,921 B1 | 3/2020 | McCullough et al. |
| 10,597,164 B2 | 3/2020 | Oldroyd et al. |
| 10,604,249 B2 | 3/2020 | McCullough et al. |
| 10,611,477 B1 | 4/2020 | McCullough et al. |
| 10,618,646 B2 | 4/2020 | McCullough et al. |
| 10,618,647 B2 | 4/2020 | McCullough et al. |
| 10,625,853 B2 | 4/2020 | McCullough et al. |
| 10,633,087 B2 | 4/2020 | McCullough et al. |
| 10,633,088 B2 | 4/2020 | McCullough et al. |
| 10,661,892 B2 | 5/2020 | McCullough et al. |
| 10,737,765 B2 | 8/2020 | Oldroyd et al. |
| 10,737,778 B2 | 8/2020 | Oldroyd et al. |
| 10,752,350 B2 | 8/2020 | McCullough et al. |
| 10,782,146 B2 * | 9/2020 | Genito .............. G01C 23/00 |
| 10,870,487 B2 | 12/2020 | McCullough et al. |
| 10,913,541 B2 | 2/2021 | Oldroyd et al. |
| 10,981,661 B2 | 4/2021 | Oldroyd et al. |
| 11,027,837 B2 | 6/2021 | McCullough et al. |
| 11,084,579 B2 | 8/2021 | Ivans et al. |
| 11,091,257 B2 | 8/2021 | McCullough et al. |
| 11,104,446 B2 | 8/2021 | McCullough et al. |
| 2002/0100834 A1 | 8/2002 | Baldwin |
| 2002/0100835 A1 | 8/2002 | Kusic |
| 2003/0062443 A1 | 4/2003 | Wagner et al. |
| 2004/0245374 A1 | 12/2004 | Morgan |
| 2006/0091258 A1 | 5/2006 | Chiu et al. |
| 2006/0266881 A1 | 11/2006 | Hughey |
| 2006/0271249 A1 * | 11/2006 | Testrake .............. G09B 9/08 701/4 |
| 2007/0212224 A1 | 9/2007 | Podgurski |
| 2007/0221780 A1 | 9/2007 | Builta |
| 2009/0008499 A1 | 1/2009 | Shaw |
| 2010/0147993 A1 | 6/2010 | Annati et al. |
| 2010/0193644 A1 | 8/2010 | Karem |
| 2010/0295321 A1 | 11/2010 | Bevirt |
| 2011/0001001 A1 | 1/2011 | Bryant |
| 2011/0042508 A1 | 2/2011 | Bevirt |
| 2011/0042509 A1 | 2/2011 | Bevirt et al. |
| 2011/0057453 A1 | 3/2011 | Roberts |
| 2011/0121570 A1 | 5/2011 | Bevirt et al. |
| 2011/0315806 A1 | 12/2011 | Piasecki et al. |
| 2012/0209456 A1 | 8/2012 | Harmon et al. |
| 2012/0234968 A1 | 9/2012 | Smith |
| 2013/0020429 A1 | 1/2013 | Kroo |
| 2013/0175404 A1 | 7/2013 | Shefer |
| 2013/0325221 A1 * | 12/2013 | Shue .............. G05D 1/0676 701/16 |
| 2013/0341458 A1 | 12/2013 | Sutton et al. |
| 2014/0018979 A1 | 1/2014 | Goossen et al. |
| 2014/0097290 A1 | 4/2014 | Leng |
| 2014/0339372 A1 | 11/2014 | Dekel et al. |
| 2015/0012154 A1 | 1/2015 | Senkel et al. |
| 2015/0014475 A1 | 1/2015 | Taylor et al. |
| 2015/0136897 A1 | 5/2015 | Seibel et al. |
| 2015/0284079 A1 | 10/2015 | Matsuda |
| 2015/0285165 A1 | 10/2015 | Steinwandel et al. |
| 2016/0068265 A1 | 3/2016 | Hoareau et al. |
| 2016/0180717 A1 | 6/2016 | Ubhi et al. |
| 2016/0214712 A1 | 7/2016 | Fisher et al. |
| 2017/0008627 A1 | 1/2017 | Soto et al. |
| 2017/0021924 A1 | 1/2017 | Kubik et al. |
| 2017/0066531 A1 | 3/2017 | McAdoo |

(56) References Cited

U.S. PATENT DOCUMENTS

| | | |
|---|---|---|
| 2017/0097644 A1 | 4/2017 | Fegely et al. |
| 2017/0144746 A1 | 5/2017 | Schank et al. |
| 2017/0158312 A1 | 6/2017 | Alber et al. |
| 2017/0174342 A1 | 6/2017 | Huang |
| 2017/0240274 A1 | 8/2017 | Regev |
| 2017/0297699 A1 | 10/2017 | Alber et al. |
| 2017/0327219 A1 | 11/2017 | Alber |
| 2017/0334557 A1 | 11/2017 | Alber et al. |
| 2018/0002011 A1 | 1/2018 | McCullough et al. |
| 2018/0002012 A1 | 1/2018 | McCullough et al. |
| 2018/0002013 A1 | 1/2018 | McCullough et al. |
| 2018/0002014 A1 | 1/2018 | McCullough et al. |
| 2018/0002015 A1 | 1/2018 | McCullough et al. |
| 2018/0002016 A1 | 1/2018 | McCullough et al. |
| 2018/0002026 A1 | 1/2018 | Oldroyd et al. |
| 2018/0002027 A1 | 1/2018 | McCullough et al. |
| 2018/0022467 A1 | 1/2018 | Alber |
| 2018/0044011 A1 | 2/2018 | Reichert |
| 2018/0244377 A1 | 8/2018 | Chan |
| 2018/0244383 A1 | 8/2018 | Valente et al. |
| 2018/0257761 A1 | 9/2018 | Oldroyd et al. |
| 2018/0265193 A1 | 9/2018 | Gibboney et al. |
| 2018/0273160 A1 | 9/2018 | Baldwin et al. |
| 2018/0327092 A1 | 11/2018 | Deng et al. |
| 2018/0362158 A1 | 12/2018 | Zhang et al. |
| 2019/0031331 A1 | 1/2019 | McCullough et al. |
| 2019/0031334 A1 | 1/2019 | McCullough et al. |
| 2019/0031335 A1 | 1/2019 | McCullough et al. |
| 2019/0031336 A1 | 1/2019 | McCullough et al. |
| 2019/0031337 A1 | 1/2019 | McCullough et al. |
| 2019/0031338 A1 | 1/2019 | McCullough et al. |
| 2019/0031339 A1 | 1/2019 | McCullough et al. |
| 2019/0031361 A1 | 1/2019 | McCullough et al. |
| 2019/0144108 A1* | 5/2019 | McCullough .......... G05D 1/102 244/23 B |
| 2019/0263516 A1 | 8/2019 | McCullough et al. |
| 2019/0389573 A1 | 12/2019 | Kahou et al. |
| 2021/0261264 A1* | 8/2021 | Shi .................. B64D 31/00 |
| 2021/0362848 A1* | 11/2021 | Spencer ............... B64C 11/001 |

FOREIGN PATENT DOCUMENTS

| | | |
|---|---|---|
| GB | 587388 A | 4/1947 |
| GB | 618475 A | 2/1949 |
| GB | 654089 A | 6/1951 |
| WO | 2001074659 A1 | 10/2001 |
| WO | 2005039973 A2 | 5/2005 |
| WO | 2014067563 A1 | 5/2014 |

OTHER PUBLICATIONS

Bell and NASA Partner for UAV Development; Transportup.com; Sep. 9, 2018.
Bell APT—Automatic Pod Transport; SUASNEWS.com; Dec. 6, 2017.
Bell Autonomous Pod Transport; MONCH.com; May 2, 2018.
Duffy, et al., The LIFT! Project—Modular, Electric Vertical Lift System with Ground Power Tether, AHS 71st Annual Forum, Virginia Beach, Virginia, May 2015.
Kang, et al., Gap and Stagger Effects on Biplanes with End Plates, 47th AIAA Aerospace Sciences Meeting Including the New Horizons Forum and Aerospace Exposition, Orlando, Florida, Jan. 2009.
Munk, General Biplane Theory, National Advisory Committee for Aeronautics, Unknown Date.
Wolfe, Frank; Bell Moving to Scale Up Antonymous Delivery Drones for US Military; Rotor & Wing International; Sep. 27, 2018.

* cited by examiner

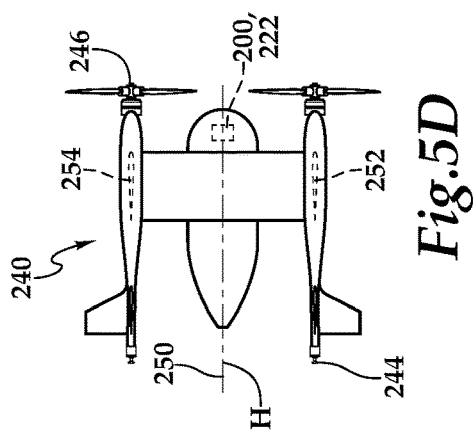
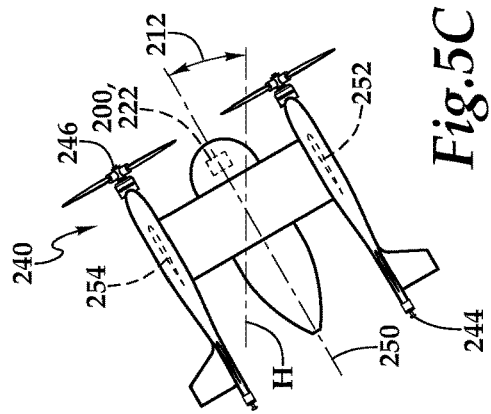
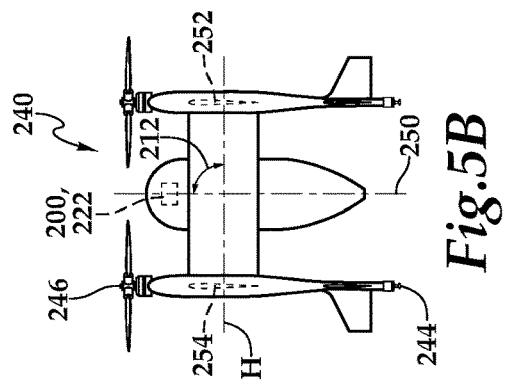
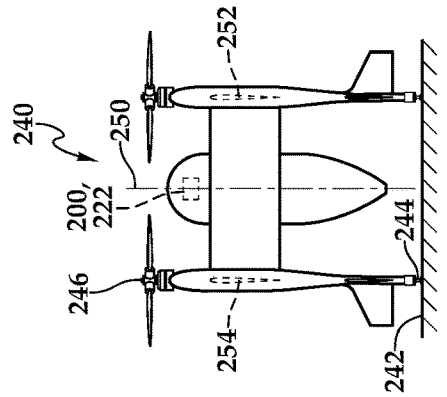

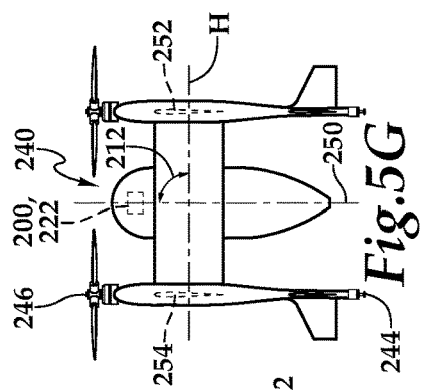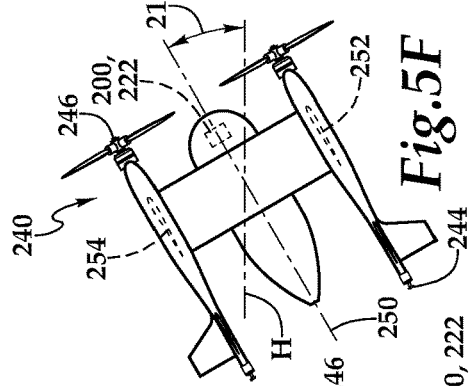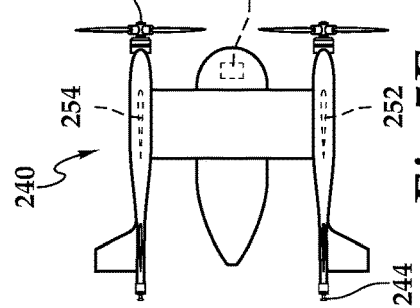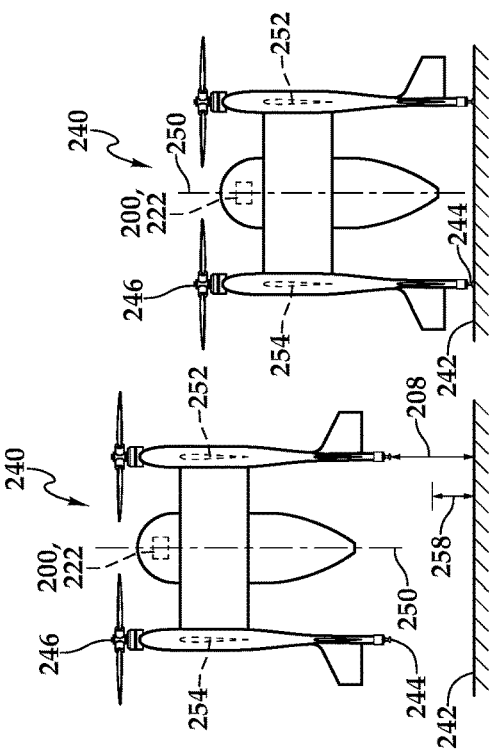

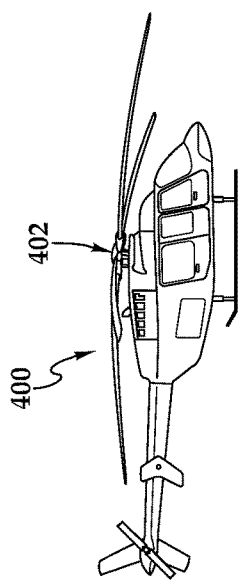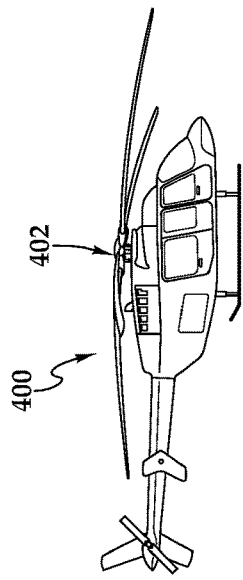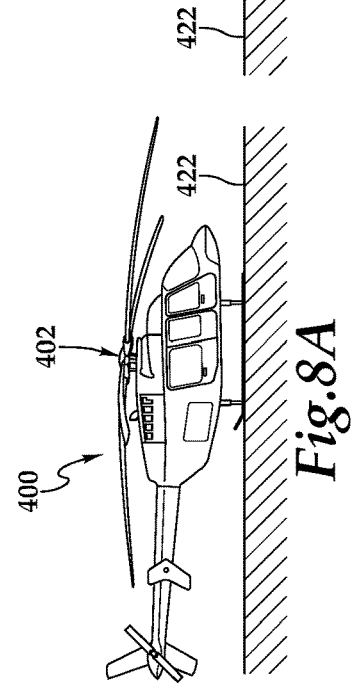

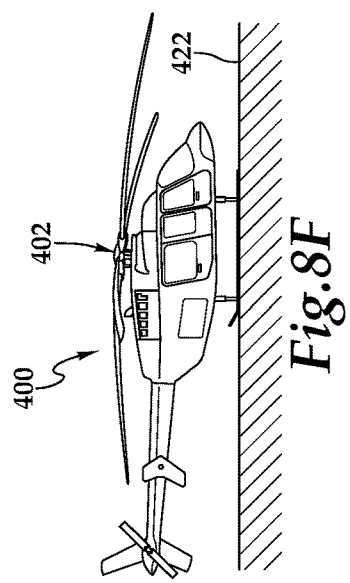
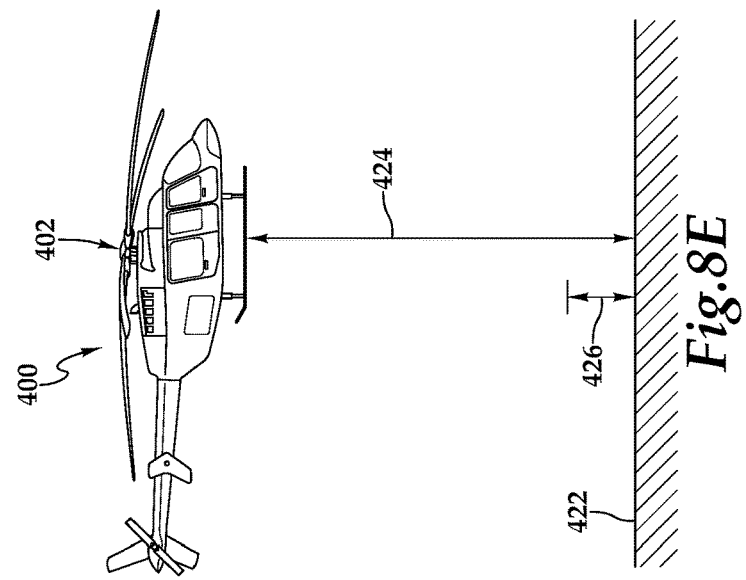

GROUND STATE DETERMINATION SYSTEMS FOR AIRCRAFT

TECHNICAL FIELD OF THE DISCLOSURE

The present disclosure relates, in general, to ground state determination systems for use on aircraft and, in particular, to systems and methods for determining whether an aircraft is on a surface such as the ground, including before takeoff or after landing, based on aircraft sensor data, thrust commands and/or other parameters.

BACKGROUND

Fixed-wing aircraft, such as airplanes, are capable of flight using wings that generate lift responsive to the forward airspeed of the aircraft, which is generated by thrust from one or more jet engines or propellers. The wings generally have an airfoil cross section and generate a lifting force as the aircraft moves forward to support the aircraft in flight. Fixed-wing aircraft, however, typically require a runway that is hundreds or thousands of feet long for takeoff and landing. Unlike fixed-wing aircraft, vertical takeoff and landing (VTOL) aircraft do not require runways. Instead, VTOL aircraft are capable of taking off and landing vertically. Rotorcraft such as helicopters, tiltrotors, tiltwings, quadcopters and other multicopters are examples of VTOL aircraft. Each of these rotorcraft utilizes one or more rotors to provide lift and thrust to the aircraft. The rotors not only enable vertical takeoff and landing, but may also enable hover, forward flight, backward flight and lateral flight. These attributes make VTOL aircraft highly versatile for use in congested, isolated or remote areas.

In an operational scenario, several important functions of VTOL aircraft depend on whether the aircraft is on a surface such as the ground or a landing pad. These functions include activating flight control loops, changing flight control loop gains, syncing positions, activating motors, deploying a payload and changing integrator gains. For example, it may be undesirable to accumulate a large integrated motor command while the aircraft is on the ground. It may also be undesirable to build a positioning error, for example due to global positioning satellite (GPS) drift, which could affect navigation. It is also useful for remote operators of an aircraft having no line of sight to the aircraft to know when the aircraft is on the ground.

Previous attempts at determining the ground state of aircraft have relied on mechanical ground proximity switches or weight sensors, which have proven to be unreliable and add weight, cost and complexity to the aircraft. These prior solutions are particularly unreliable and prohibitive when implemented on small or lightweight aircraft. Other prior systems have relied on analyzing the vibrational profile of the aircraft both in flight and on the ground and comparing such vibrational profiles to determine whether the aircraft is grounded, although such systems have also lacked adequate reliability. Accordingly, a need has arisen for ground state determination systems that reliably determine whether an aircraft is on a surface while avoiding the additional weight, cost and complexity associated with previous systems.

SUMMARY

In a first aspect, the present disclosure is directed to a ground state determination system for an aircraft including sensors configured to detect parameters of the aircraft and a flight control system implementing a ground state module. The ground state module includes a ground state monitoring module configured to monitor the parameters and a ground state determination module configured to compare each of the parameters monitored by the ground state monitoring module to a respective parameter threshold to determine whether the aircraft is on a surface.

In some embodiments, the sensors may include a distance sensor to detect an altitude of the aircraft and the parameters monitored by the ground state monitoring module may include the altitude of the aircraft. In such embodiments, the ground state determination module may be configured to compare the altitude of the aircraft to an altitude threshold, thereby determining whether the aircraft is on the surface based at least partially on the altitude of the aircraft. In certain embodiments, the sensors may include an attitude sensor to detect a pitch of the aircraft and the parameters monitored by the ground state monitoring module may include the pitch of the aircraft. In such embodiments, the ground state determination module may be configured to compare the pitch of the aircraft to a pitch threshold, thereby determining whether the aircraft is on the surface based at least partially on the pitch of the aircraft. In some embodiments, the sensors may include an accelerometer to detect a vertical acceleration of the aircraft and the parameters monitored by the ground state monitoring module may include the vertical acceleration of the aircraft. In such embodiments, the ground state determination module may be configured to compare the vertical acceleration of the aircraft to a vertical acceleration threshold, thereby determining whether the aircraft is on the surface based at least partially on the vertical acceleration of the aircraft. In certain embodiments, the sensors may include a velocity sensor to detect a vertical velocity of the aircraft and the parameters monitored by the ground state monitoring module may include the vertical velocity of the aircraft. In such embodiments, the ground state determination module may be configured to compare the vertical velocity of the aircraft to a vertical velocity threshold, thereby determining whether the aircraft is on the surface based at least partially on the vertical velocity of the aircraft.

In some embodiments, the flight control system may include a thrust command module configured to provide a thrust command to a propulsion assembly of the aircraft and the parameters monitored by the ground state monitoring module may include the thrust command. In such embodiments, the ground state determination module may be configured to compare the thrust command to a thrust command threshold, thereby determining whether the aircraft is on the surface based at least partially on the thrust command. In certain embodiments, the ground state monitoring module may include a time module configured to monitor time persistence of the parameters. In such embodiments, the ground state determination module may be configured to determine whether the aircraft is on the surface based at least partially on the time persistence of the parameters.

In a second aspect, the present disclosure is directed to an aircraft including a fuselage, sensors configured to detect parameters of the aircraft and a flight control system in communication with the sensors. The flight control system implements a ground state module including a ground state monitoring module configured to monitor the parameters and a ground state determination module configured to compare each of the parameters monitored by the ground state monitoring module to a respective parameter threshold to determine whether the aircraft is on a surface.

In some embodiments, the aircraft may be a tailsitter aircraft. In certain embodiments, the aircraft may include an airframe having first and second wings with first and second pylons extending therebetween, the fuselage coupled to the pylons. In such embodiments, the aircraft may include a two-dimensional distributed thrust array attached to the airframe, the thrust array including propulsion assemblies coupled to the first wing and propulsion assemblies coupled to the second wing.

In a third aspect, the present disclosure is directed to a method for determining a ground state of an aircraft including monitoring parameters of the aircraft; comparing each of the parameters to a respective parameter threshold; and determining whether the aircraft is on a surface in response to comparing each of the parameters to the respective parameter threshold.

In some embodiments, monitoring the parameters may include monitoring a thrust command, an altitude of the aircraft, a pitch of the aircraft, a vertical acceleration of the aircraft and/or a vertical velocity of the aircraft. In certain embodiments, monitoring the parameters may include monitoring an altitude of the aircraft and a pitch of the aircraft, comparing each of the parameters to the respective parameter threshold may include comparing the altitude of the aircraft to an altitude threshold and comparing the pitch of the aircraft to a pitch threshold and determining whether the aircraft is on the surface may include determining whether the aircraft is on the surface in response to comparing the altitude of the aircraft to the altitude threshold and comparing the pitch of the aircraft to the pitch threshold. In some embodiments, determining whether the aircraft is on the surface may include determining that the aircraft is on the surface in response to the altitude of the aircraft being less than the altitude threshold and the pitch of the aircraft exceeding the pitch threshold. In certain embodiments, the pitch threshold may be in a range between 30 degrees and 60 degrees. In some embodiments, monitoring the parameters may include monitoring a thrust command to a propulsion assembly of the aircraft, a vertical acceleration of the aircraft and a pitch of the aircraft, comparing each of the parameters to the respective parameter threshold may include comparing the thrust command to a thrust command threshold, comparing the vertical acceleration of the aircraft to a vertical acceleration threshold and comparing the pitch of the aircraft to a pitch threshold and determining whether the aircraft is on the surface may include determining whether the aircraft is on the surface in response to comparing the thrust command to the thrust command threshold, comparing the vertical acceleration of the aircraft to the vertical acceleration threshold and comparing the pitch of the aircraft to the pitch threshold. In some embodiments, determining whether the aircraft is on the surface may include determining that the aircraft is on the surface in response to the thrust command being less than the thrust command threshold, the vertical acceleration of the aircraft exceeding the vertical acceleration threshold and the pitch of the aircraft exceeding the pitch threshold. In certain embodiments, the thrust command threshold may be in a range between 10 percent and 40 percent of hover power thrust. In some embodiments, the vertical acceleration threshold may be equal to or less than zero.

In certain embodiments, monitoring the parameters may include monitoring an altitude of the aircraft, a pitch of the aircraft, a thrust command to a propulsion assembly of the aircraft and a vertical acceleration of the aircraft and comparing each of the parameters to the respective parameter threshold may include comparing the altitude of the aircraft to an altitude threshold, comparing the pitch of the aircraft to a pitch threshold, comparing the thrust command to a thrust command threshold and comparing the vertical acceleration of the aircraft to a vertical acceleration threshold. In such embodiments, determining whether the aircraft is on the surface may include a first determination step determining whether the aircraft is on the surface in response to comparing the altitude of the aircraft to the altitude threshold and comparing the pitch of the aircraft to the pitch threshold and a second determination step determining whether the aircraft is on the surface in response to comparing the thrust command to the thrust command threshold, comparing the vertical acceleration of the aircraft to the vertical acceleration threshold and comparing the pitch of the aircraft to the pitch threshold. In such embodiments, determining whether the aircraft is on the surface may include determining that the aircraft is on the surface in response to either or both of the first determination step or the second determination step determining that the aircraft is on the surface.

In some embodiments, monitoring the parameters may include monitoring an altitude of the aircraft, a thrust command to a propulsion assembly of the aircraft and a vertical acceleration of the aircraft and comparing each of the parameters to the respective parameter threshold may include comparing the altitude of the aircraft to an altitude threshold, comparing the thrust command to a thrust command threshold and comparing the vertical acceleration of the aircraft to a vertical acceleration threshold. In such embodiments, determining whether the aircraft is on the surface may include a first determination step determining whether the aircraft is on the surface in response to comparing the altitude of the aircraft to the altitude threshold and a second determination step determining whether the aircraft is on the surface in response to comparing the thrust command to the thrust command threshold and comparing the vertical acceleration of the aircraft to the vertical acceleration threshold. In such embodiments, determining whether the aircraft is on the surface may include determining that the aircraft is on the surface in response to either or both of the first determination step or the second determination step determining that the aircraft is on the surface.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which:

FIGS. 5A-5I are schematic illustrations of an aircraft having a ground state determination system in a sequential flight operating scenario in accordance with embodiments of the present disclosure;

FIGS. 8A-8F are schematic illustrations of a helicopter having a ground state determination system in a sequential flight operating scenario in accordance with embodiments of the present disclosure.

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the devices described herein may be oriented in any desired direction. As used herein, the term "coupled" may include direct or indirect coupling by any means, including by mere contact or by moving and/or non-moving mechanical connections.

Figure 1A:
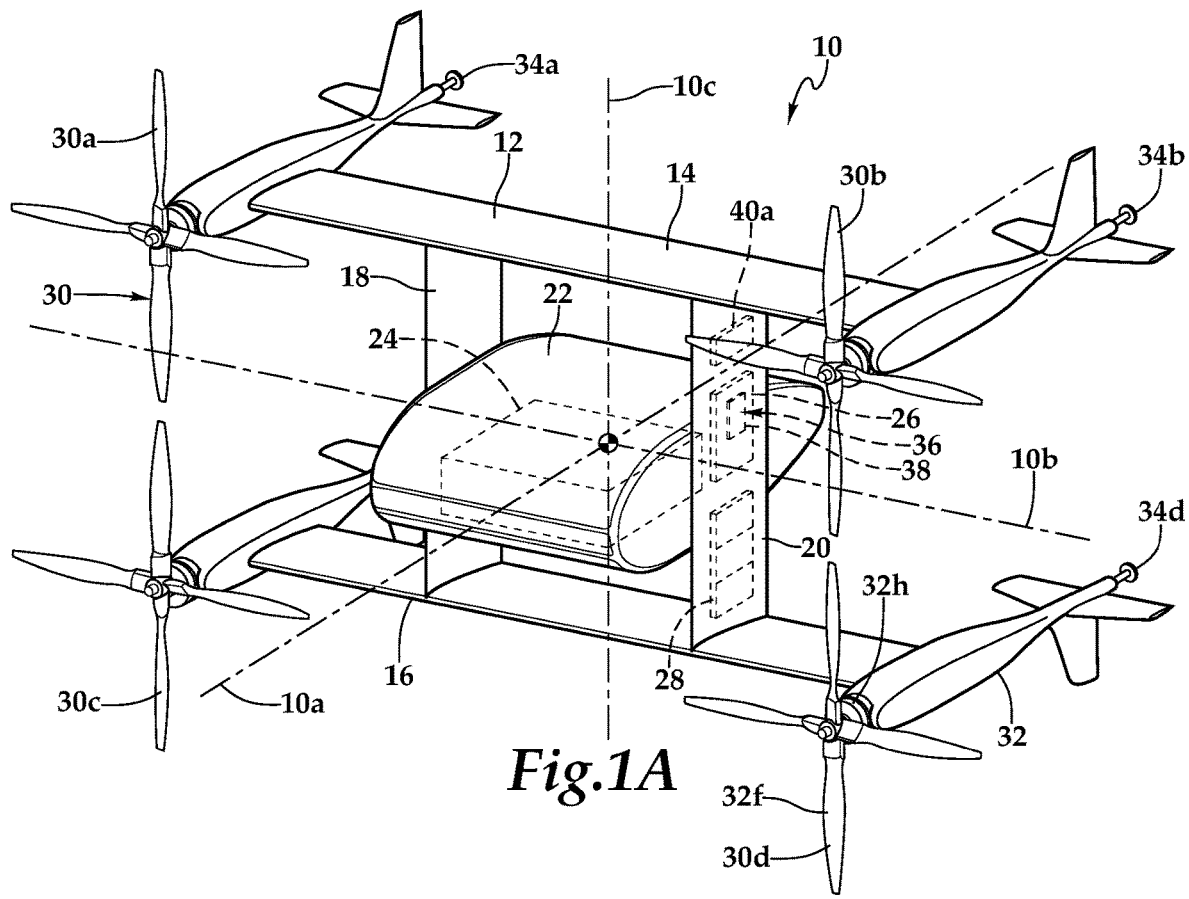
FIGS. 1A-1B are schematic illustrations of an aircraft having a ground state determination system that is operable to convert between thrust-borne lift in a VTOL orientation and wing-borne lift in a biplane orientation in accordance with embodiments of the present disclosure.
Figure 1B:
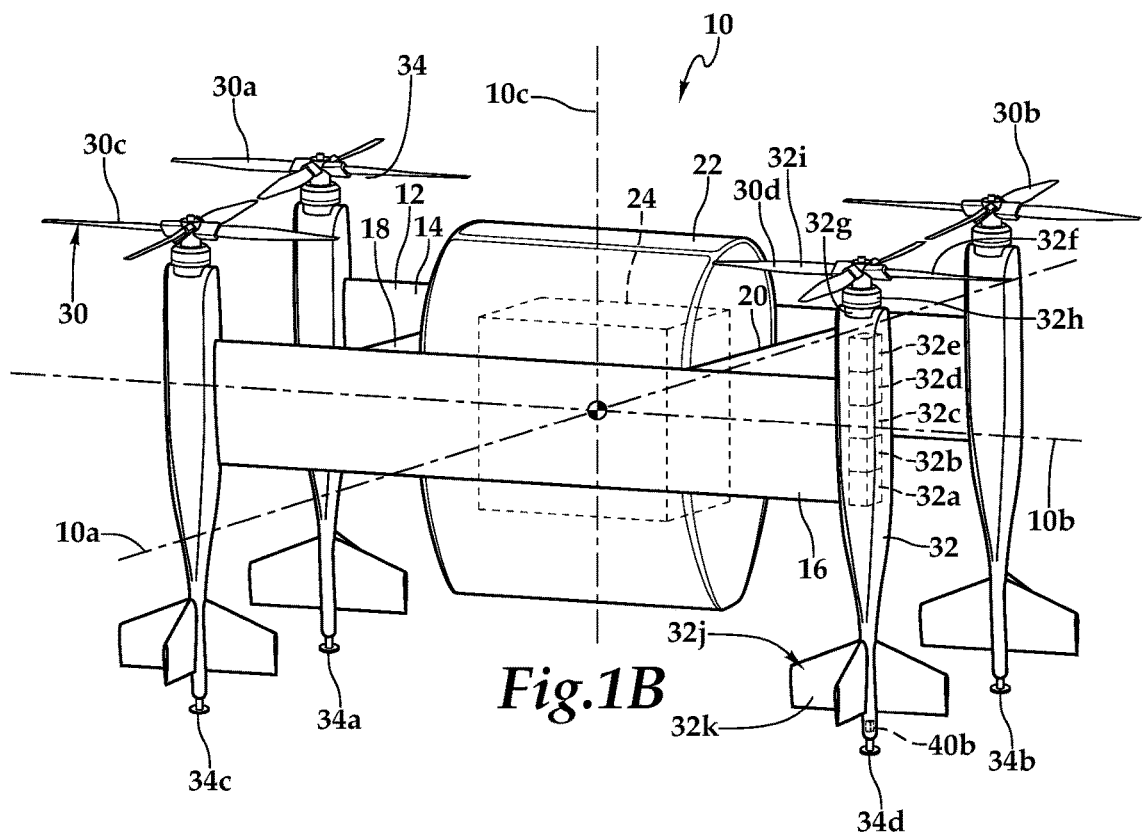

Referring to FIGS. 1A-1B in the drawings, isometric views of a tailsitter aircraft 10 having a ground state determination system that is operable to transition between thrust-borne lift in a VTOL orientation and wing-borne lift in a biplane orientation are depicted. FIG. 1A depicts aircraft 10 in the biplane orientation wherein the propulsion assemblies provide forward thrust with the forward airspeed of aircraft 10 providing wing-borne lift enabling aircraft 10 to have a high speed and/or high endurance forward flight mode. FIG. 1B depicts aircraft 10 in the VTOL orientation wherein the propulsion assemblies provide thrust-borne lift.

Aircraft 10 has a longitudinal axis 10a that may also be referred to as the roll axis, a lateral axis 10b that may also be referred to as the pitch axis and a vertical axis 10c that may also be referred to as the yaw axis. When longitudinal axis 10a and lateral axis 10b are both in a horizontal plane and normal to the local vertical in the earth's reference frame, aircraft 10 has a level flight attitude. In the illustrated embodiment, the length of aircraft 10 in the direction of lateral axis 10b is greater than the width of aircraft 10 in the direction of longitudinal axis 10a in the VTOL orientation of aircraft 10, as depicted in FIG. 1B. Both the magnitudes of the length and the width of aircraft 10 as well as the difference between the length and the width of aircraft 10 are important relative to the landing stability of aircraft 10 as well as the tip-over stability of aircraft 10 when aircraft 10 is positioned on a surface such as the ground in a tailsitter orientation.

In the illustrated embodiment, aircraft 10 has an airframe 12 including wings 14, 16 each having an airfoil cross-section that generates lift responsive to the forward airspeed of aircraft 10. Wings 14, 16 may be formed as single members or may be formed from multiple wing sections. The outer skins for wings 14, 16 are preferably formed from high strength and lightweight materials such as fiberglass, carbon, plastic, metal or other suitable material or combination of materials. In the biplane orientation of aircraft 10, wing 14 is an upper wing having a straight wing configuration and wing 16 is a lower wing having a straight wing configuration. In other embodiments, wings 14, 16 could have other designs such as anhedral and/or dihedral wing designs, swept wing designs or other suitable wing designs. In the illustrated embodiment, wings 14, 16 are substantially parallel with each other. Extending generally perpendicularly between wings 14, 16 are two truss structures depicted as pylons 18, 20. In other embodiments, more than two pylons may be present. Pylons 18, 20 are preferably formed from high strength and lightweight materials such as fiberglass, carbon, plastic, metal or other suitable material or combination of materials. In the illustrated embodiment, pylons 18, 20 are substantially parallel with each other.

Aircraft 10 includes a cargo pod 22 that is coupled between pylons 18, 20. Cargo pod 22 may be fixably or removably coupled to pylons 18, 20. In addition, in the coupled position, cargo pod 22 may be fixed, shiftable or rotatable relative to pylons 18, 20. Cargo pod 22 has an aerodynamic shape configured to minimize drag during high speed forward flight. Cargo pod 22 is preferably formed from high strength and lightweight materials such as fiberglass, carbon, plastic, metal or other suitable material or combination of materials. Cargo pod 22 has an interior region that may receive a payload 24 therein such as one or more packages. Aircraft 10 may autonomously transport and deliver payload 24 to a desired location in which case, aircraft 10 may be referred to as an unmanned aerial vehicle (UAV), an unmanned aerial system (UAS) or a drone. In other embodiments, aircraft 10 may not include cargo pod 22.

One or more of cargo pod 22, wings 14, 16 and/or pylons 18, 20 may contain flight control systems, energy sources, communication lines and other desired systems. For example, pylon 20 houses flight control system 26 of aircraft 10. Flight control system 26 is preferably a redundant digital flight control system including multiple independent flight control computers. For example, the use of a triply redundant flight control system 26 improves the overall safety and reliability of aircraft 10 in the event of a failure in flight control system 26. Flight control system 26 preferably includes non-transitory computer readable storage media including a set of computer instructions executable by one or more processors for controlling the operation of aircraft 10. Flight control system 26 may be implemented on one or more general-purpose computers, special purpose computers or other machines with memory and processing capability. For example, flight control system 26 may include one or more memory storage modules including, but not limited to, internal storage memory such as random access memory, non-volatile memory such as read only memory, removable memory such as magnetic storage memory, optical storage, solid-state storage memory or other suitable memory storage entity. Flight control system 26 may be a microprocessor-based system operable to execute program code in the form of machine-executable instructions. In addition, flight control system 26 may be selectively connectable to other computer systems via a proprietary encrypted network, a public encrypted network, the Internet or other suitable communication network that may include both wired and wireless connections.

One or more of cargo pod 22, wings 14, 16 and/or pylons 18, 20 may contain one or more electrical power sources depicted as a plurality of batteries 28 in pylon 20. Batteries 28 supply electrical power to flight control system 26, the distributed thrust array of aircraft 10 and/or other power consumers of aircraft 10 such that aircraft 10 may be referred to as an electric vertical takeoff and landing (eVTOL) aircraft. In other embodiments, aircraft 10 may have a hybrid power system that includes one or more internal combustion engines and an electric generator. Preferably, the electric generator is used to charge batteries 28. In other embodiments, the electric generator may provide power directly to a power management system and/or the power consumers of aircraft 10. In still other embodiments, aircraft 10 may use fuel cells as the electrical power source.

Cargo pod 22, wings 14, 16 and/or pylons 18, 20 also contain a wired and/or wireless communication network that enables flight control system 26 to communicate with the distributed thrust array of aircraft 10. In the illustrated embodiment, aircraft 10 has a two-dimensional distributed thrust array that is coupled to airframe 12. As used herein, the term "two-dimensional thrust array" refers to a plurality of thrust generating elements that occupy a two-dimensional space in the form of a plane. A minimum of three thrust generating elements is required to form a "two-dimensional thrust array." A single aircraft may have more than one "two-dimensional thrust array" if multiple groups of at least three thrust generating elements each occupy separate two-dimensional spaces thus forming separate planes. As used herein, the term "distributed thrust array" refers to the use of multiple thrust generating elements each producing a portion of the total thrust output. The use of a "distributed thrust array" provides redundancy to the thrust generation capabilities of the aircraft including fault tolerance in the event of the loss of one of the thrust generating elements. A "distributed thrust array" can be used in conjunction with a "distributed power system" in which power to each of the thrust generating elements is supplied by a local power system instead of a centralized power source. For example, in a "distributed thrust array" having a plurality of propulsion assemblies acting as the thrust generating elements, a "distributed power system" may include individual battery elements housed within the nacelle of each propulsion assembly.

The two-dimensional distributed thrust array of aircraft 10 includes a plurality of propulsion assemblies, individually denoted as 30a, 30b, 30c, 30d and collectively referred to as propulsion assemblies 30. In the illustrated embodiment, propulsion assemblies 30a, 30b are coupled at the wingtips of wing 14 and propulsion assemblies 30c, 30d are coupled at the wingtips of wing 16. By positioning propulsion assemblies 30a, 30b, 30c, 30d at the wingtips of wings 14, 16, the thrust and torque generating elements are positioned at the maximum outboard distance from the center of gravity of aircraft 10 located, for example, at the intersection of axes 10a, 10b, 10c. The outboard locations of propulsion assemblies 30 provide dynamic stability to aircraft 10 in hover and a high dynamic response in the VTOL orientation of aircraft 10 enabling efficient and effective pitch, yaw and roll control by changing the thrust, thrust vector and/or torque output of certain propulsion assemblies 30 relative to other propulsion assemblies 30.

Even though the illustrated embodiment depicts four propulsion assemblies, the distributed thrust array of aircraft 10 could have other numbers of propulsion assemblies both greater than or less than four. Also, even though the illustrated embodiment depicts propulsion assemblies 30 in a wingtip mounted configuration, the distributed thrust array of aircraft 10 could have propulsion assemblies coupled to the wings and/or pylons in other configurations such as mid-span configurations. Further, even though the illustrated embodiment depicts propulsion assemblies 30 in a mid-wing configuration, the distributed thrust array of aircraft 10 could have propulsion assemblies coupled to the wings in a low wing configuration, a high wing configuration or any combination or permutation thereof. In the illustrated embodiment, propulsion assemblies 30 are variable speed propulsion assemblies having fixed pitch rotor blades and thrust vectoring capability. Depending upon the implementation, propulsion assemblies 30 may have longitudinal thrust vectoring capability, lateral thrust vectoring capability or omnidirectional thrust vectoring capability. In other embodiments, propulsion assemblies 30 may operate as single speed propulsion assemblies, may have variable pitch rotor blades and/or may be non-thrust vectoring propulsion assemblies.

Propulsion assemblies 30 may be independently attachable to and detachable from airframe 12 and may be standardized and/or interchangeable units and preferably line replaceable units (LRUs) providing easy installation and removal from airframe 12. The use of line replaceable propulsion units is beneficial in maintenance situations if a fault is discovered with one of the propulsion assemblies. In this case, the faulty propulsion assembly 30 can be decoupled from airframe 12 by simple operations and another propulsion assembly 30 can then be attached to airframe 12. In other embodiments, propulsion assemblies 30 may be permanently coupled to wings 14, 16.

Referring to FIG. 1B, component parts of propulsion assembly 30d will now be described. It is noted that propulsion assembly 30d is representative of each propulsion assembly 30 therefore, for sake of efficiency, certain features have been disclosed only with reference to propulsion assembly 30d. One having ordinary skill in the art, however, will fully appreciate an understanding of each propulsion assembly 30 based upon the disclosure herein of propulsion assembly 30d. In the illustrated embodiment, propulsion assembly 30d includes a nacelle 32 that houses components including a battery 32a, an electronic speed controller 32b, one or more actuators 32c, an electronics node 32d, one or more sensors 32e and other desired electronic equipment. Nacelle 32 also supports a propulsion system 32f including a gimbal 32g, a variable speed electric motor 32h and a rotor assembly 32i. Extending from a lower end of nacelle 32 is a tail assembly 32j that includes one or more aerosurfaces 32k. In the illustrated embodiment, aerosurfaces 32k include stationary horizontal and vertical stabilizers. In other embodiments, aerosurfaces 32k may be active aerosurfaces that serve as elevators to control the pitch or angle of attack of wings 14, 16 and/or ailerons to control the roll or bank of aircraft 10 in the biplane orientation of aircraft 10. Aerosurfaces 32k also serve to enhance hover stability in the VTOL orientation of aircraft 10.

Flight control system 26 communicates via a wired communications network within airframe 12 with electronics nodes 32d of propulsion assemblies 30. Flight control system 26 receives sensor data from sensors 32e and sends flight command information to the electronics nodes 32d such that each propulsion assembly 30 may be individually and independently controlled and operated. For example, flight control system 26 is operable to individually and independently control the speed and the thrust vector of each propulsion system 32f. Flight control system 26 may autonomously control some or all aspects of flight operation for aircraft 10. Flight control system 26 is also operable to communicate with remote systems, such as a ground station via a wireless communications protocol. The remote system may be operable to receive flight data from and provide commands to flight control system 26 to enable remote flight control over some or all aspects of flight operation for aircraft 10.

Aircraft 10 has a landing gear assembly 34 that includes a plurality of landing feet depicted as landing foot 34a coupled to a lower or aft end of propulsion assembly 30a, landing foot 34b coupled to a lower or aft end of propulsion assembly 30b, landing foot 34c coupled to a lower or aft end of propulsion assembly 30c and landing foot 34d coupled to a lower or aft end of propulsion assembly 30d. By positioning landing feet 34a, 34b, 34c, 34d at the lower end of wingtip mounted propulsion assemblies 30, landing feet 34a, 34b, 34c, 34d are positioned at the maximum outboard distance from the center of gravity of aircraft 10 located, for example, at the intersection of axes 10a, 10b, 10c, which provides for maximum landing stability and tip-over stability for aircraft 10. In an operational scenario, several important functions of aircraft 10 depend upon whether aircraft 10 is on a surface such as the ground or a landing pad. These functions include activating flight control loops, changing flight control loop gains, syncing positions, activating motors, deploying a payload and changing integrator gains. For example, it may be undesirable to accumulate a large integrated motor command while aircraft 10 is on the ground. It may also be undesirable to build a positioning error, for example due to global positioning satellite (GPS) drift, which could affect navigation. It may also be useful for remote operators of aircraft 10 having no line of sight or other visual feedback of aircraft 10 to know when aircraft 10 is on the ground.

Previous attempts at determining the ground state of aircraft have relied upon mechanical ground proximity switches or weight sensors, which have proven to be unreliable and add weight, cost and complexity to the aircraft. These prior solutions are particularly unreliable and prohibitive when implemented on small or lightweight aircraft such as aircraft 10. Other prior systems have relied on analyzing the vibrational profile of an aircraft both in flight and on the ground and comparing such vibrational profiles to determine whether the aircraft is grounded, although such systems have also lacked adequate reliability. To address these and other drawbacks of prior systems, aircraft 10 includes a ground state determination system 36. Ground state determination system 36 includes a ground state module 38 implemented by flight control system 26 that monitors a combination of aircraft parameters such as above ground level (AGL) altitude, vertical acceleration, motor commands and/or attitude from one or more sensors 32e, 40a, 40b or other components and compares such aircraft parameters to respective parameter thresholds to determine whether aircraft 10 is on a surface. Ground state determination system 36 does not rely solely on ground proximity switches or weight sensors, if any at all, which have been shown to be unreliable and may require additional weight, power, cost, complexity or wiring unsuitable for small or lightweight vehicles such as aircraft 10.

It should be appreciated that aircraft 10 is merely illustrative of a variety of aircraft that can implement the embodiments disclosed herein. Indeed, ground state determination system 36 may be implemented on any aircraft. Other aircraft implementations can include helicopters, hybrid aircraft, tiltwing aircraft, tiltrotor aircraft, quad tiltrotor aircraft, gyrocopters, propeller-driven airplanes, compound helicopters, jets, and the like. As such, those skilled in the art will recognize that ground state determination system 36 can be integrated into a variety of aircraft configurations. It should be appreciated that even though aircraft are particularly well-suited to implement the embodiments of the present disclosure, non-aircraft vehicles and devices can also implement the embodiments.

Figure 2:
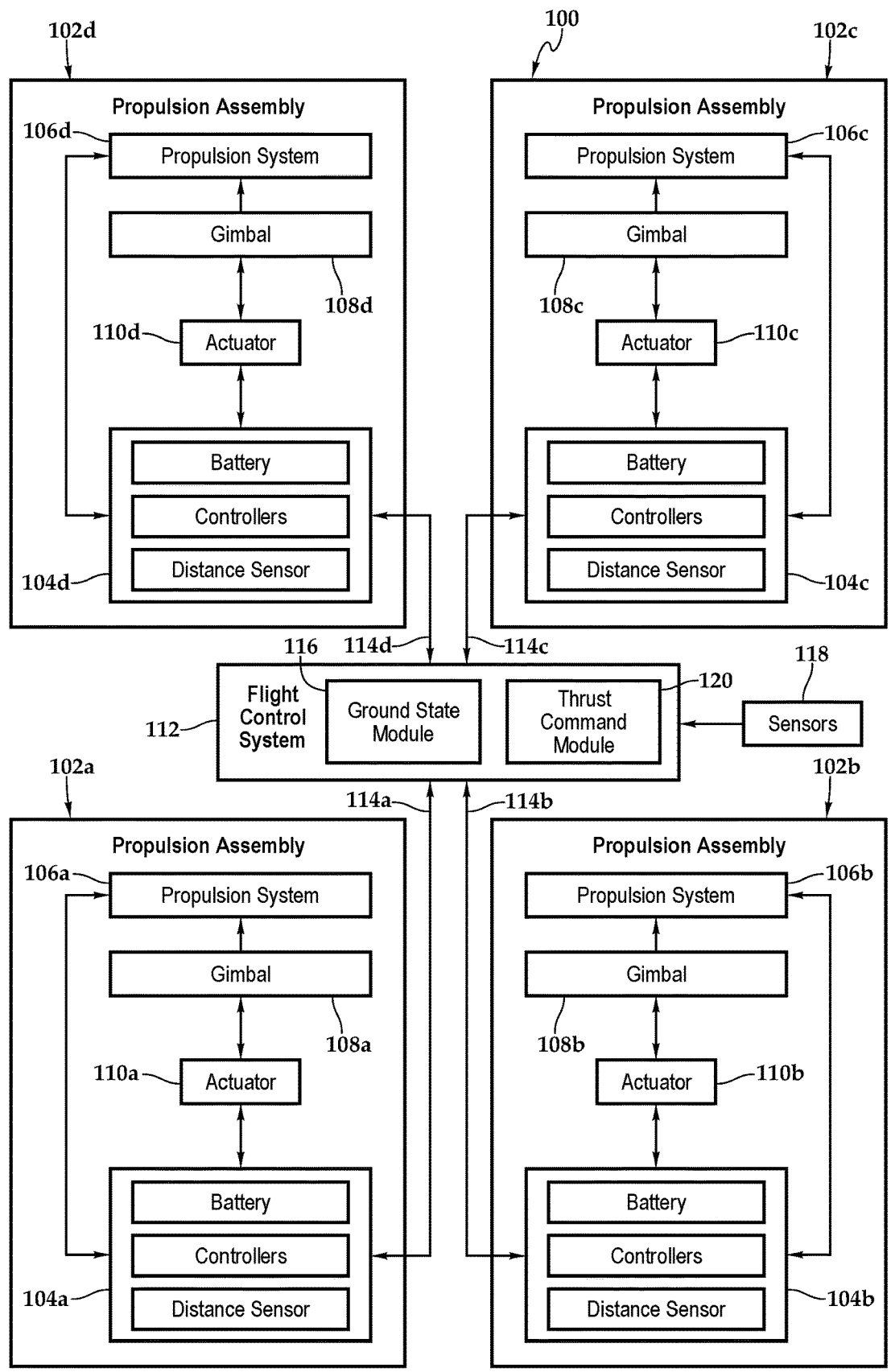
FIG. 2 is a block diagram of one implementation of a plurality of propulsion assemblies and a flight control system for an aircraft having a ground state determination system in accordance with embodiments of the present disclosure.

Referring next to FIG. 2, a block diagram illustrates one implementation of a propulsion and flight control system for an aircraft 100 that is representative of aircraft 10 discussed herein. Specifically, aircraft 100 includes four propulsion assemblies 102a, 102b, 102c, 102d that form a two-dimensional thrust array of thrust vectoring propulsion assemblies. Propulsion assembly 102a includes various electronic components 104a including one or more batteries, one or more controllers and one or more sensors including a distance sensor such as an altimeter, which may be located anywhere on propulsion assembly 104a or aircraft 100 depending on a number of factors such as the minimum distance requirement for the altimeter. Propulsion assembly 102a also includes a propulsion system 106a described herein as including an electric motor and a rotor assembly. In the illustrated embodiment, propulsion assembly 102a includes a two-axis gimbal 108a operated by one or more actuators 110a. In other embodiments, propulsion assembly 102a may include a single-axis gimbal or other mechanism for thrust vectoring. In still other embodiments, propulsion assembly 102a may be a non-thrust vectoring propulsion assembly.

Propulsion assembly 102b includes an electronics node 104b depicted as including one or more batteries, one or more controllers and one or more sensors such as a distance sensor. Propulsion assembly 102b also includes a propulsion system 106b and a two-axis gimbal 108b operated by one or more actuators 110b. Propulsion assembly 102c includes an electronics node 104c depicted as including one or more batteries, one or more controllers and one or more sensors such as a distance sensor. Propulsion assembly 102c also includes a propulsion system 106c and a two-axis gimbal 108c operated by one or more actuators 110c. Propulsion assembly 102d includes an electronics node 104d depicted as including one or more batteries, one or more controllers and one or more sensors such as a distance sensor. Propulsion assembly 102d also includes a propulsion system 106d and a two-axis gimbal 108d operated by one or more actuators 110d.

Flight control system 112 is operably associated with each of propulsion assemblies 102a, 102b, 102c, 102d and is linked to electronic nodes 104a, 104b, 104c, 104d by a fly-by-wire communications network depicted as arrows 114a, 114b, 114c, 114d. Flight control system 112 receives sensor data from and sends commands to propulsion assemblies 102a, 102b, 102c, 102d to enable flight control system 112 to independently control each of propulsion assemblies 102a, 102b, 102c, 102d, as discussed herein. Aircraft 100 includes a ground state determination system in which flight control system 112 implements a ground state module 116. Ground state module 116 monitors aircraft parameters detected by the various sensors of aircraft 100 including the distance sensors of electronic nodes 104a, 104b, 104c, 104d and/or sensors 118. Sensors 118 may include any combination of sensors such as an attitude sensor to detect a pitch or tipover point of aircraft 100, an accelerometer to detect a vertical acceleration of aircraft 100, a velocity sensor to detect a vertical velocity of aircraft 100 and/or other sensors. Flight control system 112 also includes a thrust command module 120 that issues thrust commands to propulsion assemblies 102a, 102b, 102c, 102d. Ground state module 116 also monitors the thrust commands that issue from thrust command module 120. Ground state module 116 compares the aircraft parameters from the various sensors and/or thrust command module 120 to respective parameter thresholds to determine whether aircraft 100 is on a surface.

Figure 3:
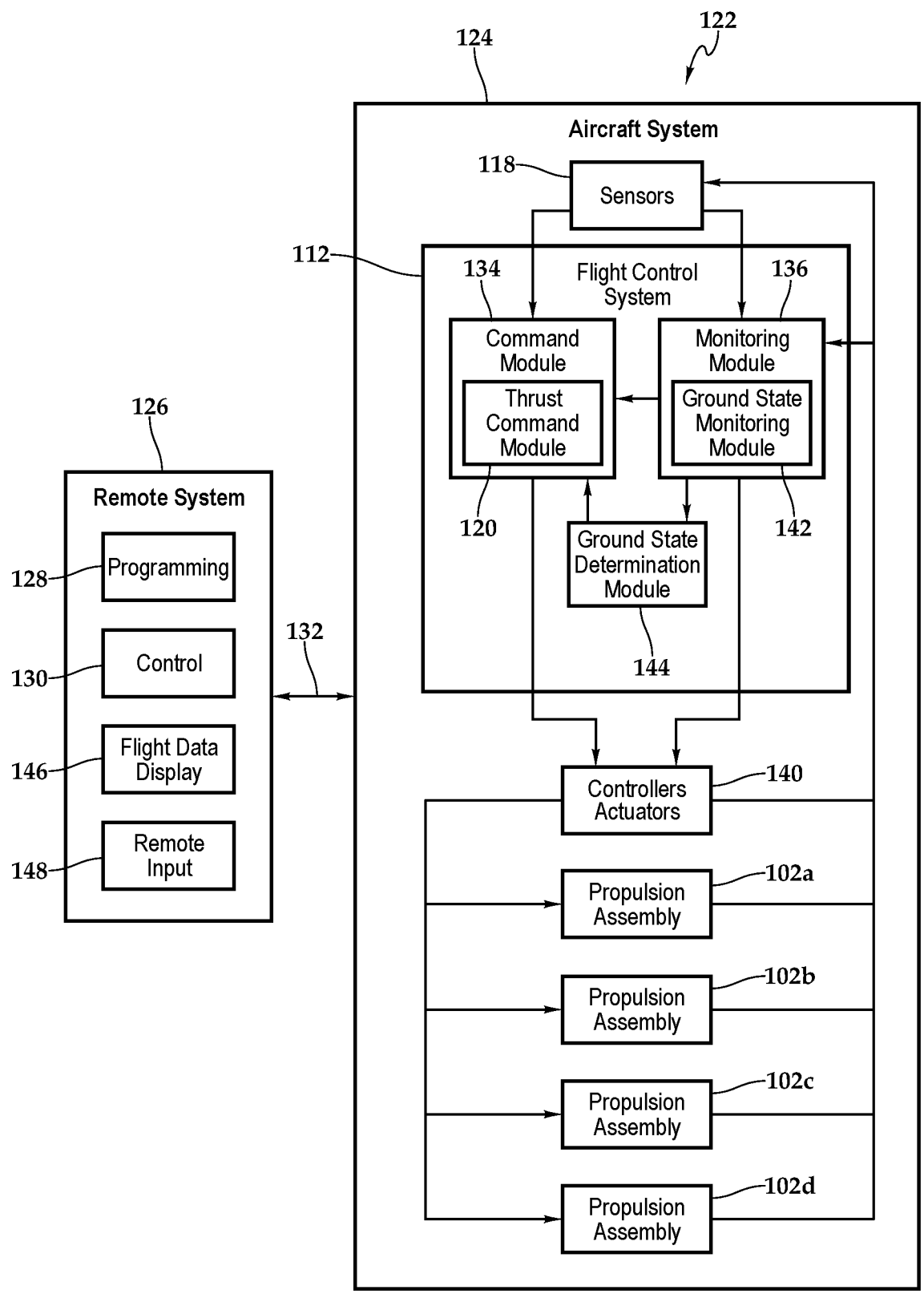
FIG. 3 is a block diagram of autonomous and remote control systems for an aircraft having a ground state determination system in accordance with embodiments of the present disclosure.

Referring additionally to FIG. 3 in the drawings, a block diagram depicts a control system 122 operable for use with aircraft 100 or aircraft 10 of the present disclosure. In the illustrated embodiment, system 122 includes two primary computer based subsystems; namely, an aircraft system 124 and a remote system 126. In some implementations, remote system 126 includes a programming application 128 and a remote control application 130. Programming application 128 enables a user to provide a flight plan and mission information to aircraft 100 such that flight control system 112 may engage in autonomous control over aircraft 100. For example, programming application 128 may communicate with flight control system 112 over a wired or wireless communication channel 132 to provide a flight plan including, for example, a starting point, a trail of waypoints and an ending point such that flight control system 112 may use waypoint navigation during the mission. In addition, programming application 128 may provide one or more tasks to flight control system 112 for aircraft 100 to accomplish during the mission such as delivery of a payload to a desired location. Following programming, aircraft 100 may operate autonomously responsive to commands generated by flight control system 112.

In the illustrated embodiment, flight control system 112 includes a command module 134 and a monitoring module 136. It is to be understood by those skilled in the art that these and other modules executed by flight control system 112 may be implemented in a variety of forms including hardware, software, firmware, special purpose processors and/or combinations thereof. Flight control system 112 receives input from a variety of sources including internal sources such as thrust command module 120, sensors 118, controllers/actuators 140, propulsion assemblies 102a, 102b, 102c, 102d as well as external sources such as remote system 126, global positioning system satellites or other location positioning systems and the like.

During the various operating modes of aircraft 100 such as the vertical takeoff flight mode, the hover flight mode, the forward flight mode, transition flight modes and the vertical landing flight mode, command module 134 including thrust command module 120 provides commands to controllers/actuators 140. These commands enable independent operation of propulsion assemblies 102a, 102b, 102c, 102d including rotor speed, thrust vector and the like. Flight control system 112 receives feedback from controllers/actuators 140 and propulsion assemblies 102a, 102b, 102c, 102d. This feedback is processed by monitoring module 136 that can supply correction data and other information to command module 134 and to controllers/actuators 140. Sensors 118, such as an attitude and heading reference system (AHRS) with solid-state or microelectromechanical systems (MEMS) gyroscopes, accelerometers and magnetometers as well as other sensors including positioning sensors, speed sensors, environmental sensors, fuel sensors, temperature sensors, location sensors and the like also provide information to flight control system 112 to further enhance autonomous control capabilities. A ground state monitoring module 142 of monitoring module 136 monitors any combination of aircraft parameters detected by or associated with sensors 118, thrust command module 120 and/or propulsion assemblies 102a, 102b, 102c, 102d. A ground state determination module 144 compares the aircraft parameters monitored by ground state monitoring module 142 to respective parameter thresholds to determine whether aircraft 100 is on a surface.

Some or all of the autonomous control capability of flight control system 112 can be augmented or supplanted by remote flight control from, for example, remote system 126. Remote system 126 may include one or computing systems that may be implemented on general-purpose computers, special purpose computers or other machines with memory and processing capability. The computing systems may be microprocessor-based systems operable to execute program code in the form of machine-executable instructions. In addition, the computing systems may be connected to other computer systems via a proprietary encrypted network, a public encrypted network, the Internet or other suitable communication network that may include both wired and wireless connections. Remote system 126 communicates with flight control system 112 via communication link 132 that may include both wired and wireless connections.

While operating remote control application 130, remote system 126 is configured to display information relating to one or more aircraft of the present disclosure on one or more flight data display devices 146. Display devices 146 may be configured in any suitable form, including, for example, liquid crystal displays, light emitting diode displays or any suitable type of display. Remote system 126 may also include audio output and input devices such as a microphone, speakers and/or an audio port allowing an operator to communicate with other operators or a base station. Display device 146 may also serve as a remote input device 148 if a touch screen display implementation is used, however, other remote input devices, such as a keyboard or joystick, may alternatively be used to allow an operator to provide control commands to an aircraft being operated responsive to remote control.

Figure 4:
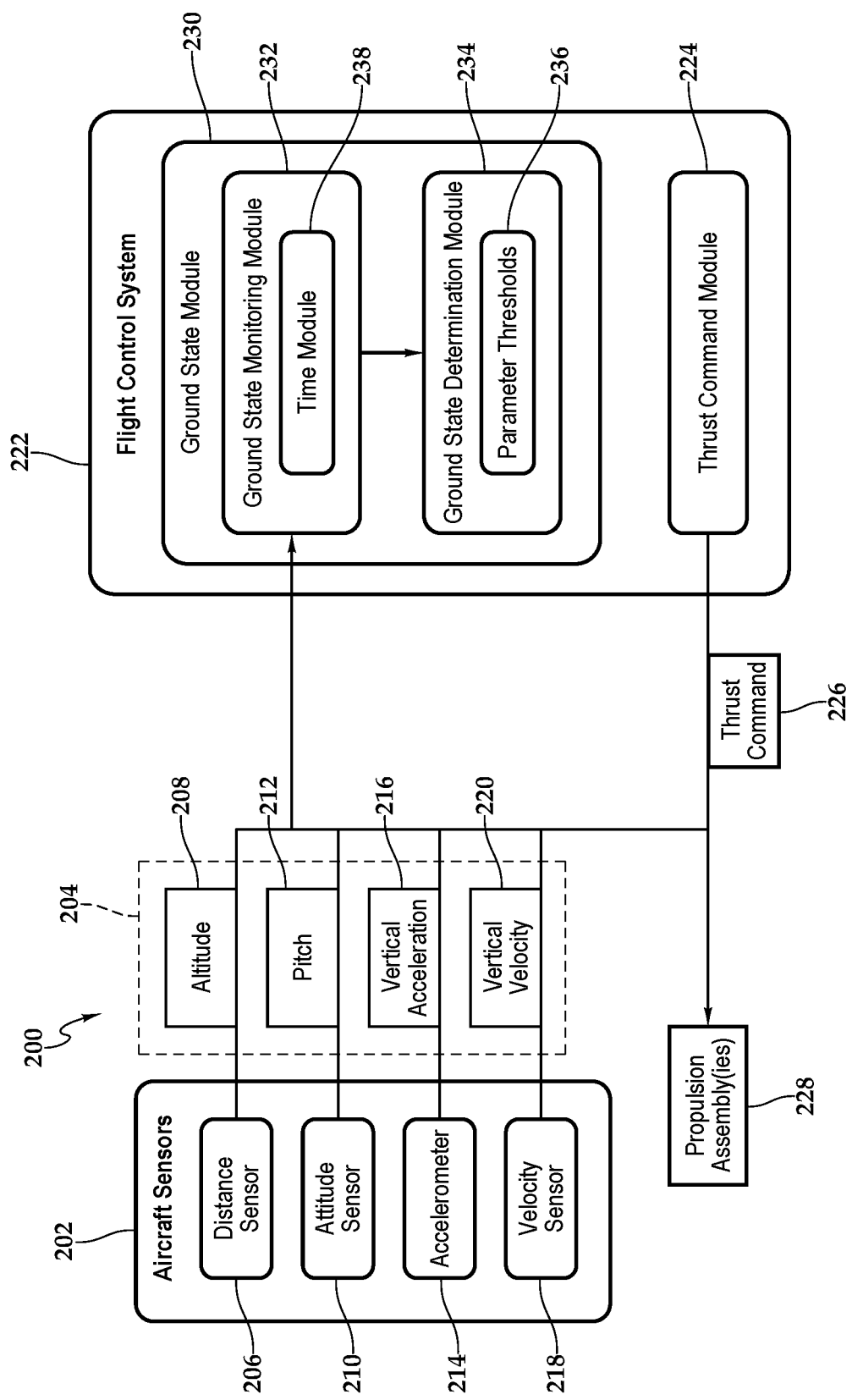
FIG. 4 is a block diagram of a ground state determination system for an aircraft in accordance with embodiments of the present disclosure.

Referring to FIG. 4 in the drawings, a ground state determination system for an aircraft is schematically illustrated and generally designated 200. Ground state determination system 200 may be implemented on any VTOL aircraft such as aircraft 10 in FIGS. 1A-1B or aircraft 100 in FIG. 2. Ground state determination system 200 utilizes aircraft sensors 202, which may be located anywhere on the aircraft. More particularly, ground state determination system 200 utilizes various parameters 204 detected by aircraft sensors 202 to determine whether the aircraft is on a surface. Aircraft sensors 202 include distance sensor 206, which detects altitude 208 of the aircraft. Distance sensor 206 may be any device capable of measuring distance such as an above ground level (AGL) altitude sensor. Distance sensor 206 may be a radar altimeter, laser altimeter, acoustic altimeter, ultrasonic altimeter, optical sensor or other suitable distance sensor. One or more distance sensors 206 may be located at or near the landing gear of the aircraft such as on aft portions of nacelles 32 of aircraft 10 in FIGS. 1A-1B. Distance sensor 206, however, may be located anywhere on the aircraft. Aircraft sensors 202 include attitude sensor 210, which detects pitch 212 of the aircraft. Attitude sensor 210 may be used, for example, to determine whether the aircraft is in the biplane orientation shown in FIG. 1A, the VTOL orientation shown in FIG. 1B or any position therebetween. In some embodiments, pitch 212 may be expressed as an angle by which the pitch of the aircraft deviates from the biplane orientation shown in FIG. 1A. Aircraft sensors 202 include accelerometer 214, which detects vertical acceleration 216 of the aircraft. Accelerometer 214 is capable of detecting both negative, or descending, vertical acceleration and positive, or ascending, vertical acceleration. Aircraft sensors 202 also include velocity sensor 218, which detects vertical velocity 220 of the aircraft.

Flight control system 222 of the aircraft implements thrust command module 224, which provides one or more thrust commands 226 to one or more aircraft propulsion assemblies 228 such as propulsion assemblies 30a, 30b, 30c, 30d in FIGS. 1A-1B. Thrust command 226 may be expressed as a percentage, fraction or proportion of a maximum thrust amount such as hover power thrust for the aircraft. In some embodiments, thrust command 226 is one of the aircraft parameters used by ground state determination system 200 to determine whether the aircraft is on a surface.

Ground state determination system 200 includes ground state module 230 implemented by flight control system 222. Ground state module 230 includes ground state monitoring module 232, which monitors the aircraft parameters including altitude 208, pitch 212, vertical acceleration 216, vertical velocity 220, thrust command 226 or any combination thereof. Ground state module 230 also includes ground state determination module 234, which compares any combination of aircraft parameters 208, 212, 216, 220, 226 monitored by ground state monitoring module 232 to parameter thresholds 236 to determine whether the aircraft is on a surface. For example, in determining whether the aircraft is on a surface, ground state determination module 234 may compare altitude 208 to an altitude threshold, pitch 212 to a pitch threshold, vertical acceleration 216 to a vertical acceleration threshold, vertical velocity 220 to a vertical velocity threshold and/or thrust command 226 to a thrust command threshold.

Ground state monitoring module 232 may monitor, and ground state determination module 234 may utilize, any combination of aircraft parameters 208, 212, 216, 220, 226 to determine whether the aircraft is on a surface. In some embodiments, ground state monitoring module 232 monitors altitude 208 and pitch 212 of the aircraft and ground state determination module 234 compares altitude 208 and pitch 212 of the aircraft to altitude and pitch thresholds, respectively. Ground state determination module 234 may then determine whether the aircraft is on a surface in response to comparing altitude 208 and pitch 212 of the aircraft to altitude and pitch thresholds. For example, ground state determination module 234 may determine that the aircraft is on a surface in response to altitude 208 being less than the altitude threshold and pitch 212 exceeding the pitch threshold. The altitude threshold may be a predetermined threshold taking into account the location of distance sensor 206 on the aircraft and/or the minimum distance capable of being detected by distance sensor 206. In one non-limiting example, if distance sensor 206 is located on the landing gear of the aircraft, the altitude threshold may be in a range between one inch to three feet such as one foot. The pitch threshold may be in a range between 30 degrees and 60 degrees such as 45 degrees, or any other pitch threshold that indicates that the tipover point of the aircraft is oriented for vertical takeoff or landing as opposed to forward flight. For example, the pitch threshold may be predetermined such that pitch 212 exceeds the pitch threshold when the aircraft is in the VTOL orientation of aircraft 10 shown in FIG. 1B. In alternative embodiments, pitch 212 may be measured, and the pitch threshold may be predetermined, such that pitch 212 is less than the pitch threshold when the aircraft is oriented for vertical takeoff or landing, in which case the criterion for determining that the aircraft is on a surface is that pitch 212 is less than the pitch threshold.

In other embodiments, ground state monitoring module 232 monitors thrust command 226 to propulsion assembly 228 as well as vertical acceleration 216 and pitch 212 of the aircraft and ground state determination module 234 compares thrust command 226 to a thrust command threshold, vertical acceleration 216 to a vertical acceleration threshold and pitch 212 to a pitch threshold. Ground state determination module 234 may then determine whether the aircraft is on a surface based on the comparison of thrust command 226, vertical acceleration 216 and pitch 212 to parameter thresholds 236. For example, ground state determination module 234 may determine that the aircraft is on a surface in response to thrust command 226 being less than a thrust command threshold, vertical acceleration 216 exceeding a vertical acceleration threshold and pitch 212 exceeding a pitch threshold. The thrust command threshold may be predetermined based on a variety of factors such as the thrust-to-weight ratio of the aircraft. In one non-limiting example, the thrust command threshold may be in a range between 10 percent and 40 percent of hover power thrust such as 25 percent of hover power thrust. In another non-limiting example, the vertical acceleration threshold may be equal to or less than zero such as $-1$ ft/s$^2$. Thus, if vertical acceleration 216 exceeds the vertical acceleration threshold, it may be safely determined that the aircraft is not accelerating downward. Other vertical acceleration thresholds, either greater than or less than zero, may also be selected that ensure that the aircraft is not accelerating downward. In yet other embodiments, ground state determination module 234 may determine whether the aircraft is on a surface based on an error or discrepancy in vertical velocity 220 of the aircraft. More particularly, a difference threshold between the calculated vertical velocity of the aircraft and the actual vertical velocity 220 detected by velocity sensor 218 may be used alone or in conjunction with the other aircraft parameters to determine whether the aircraft is on a surface.

In determining the ground state of the aircraft, aircraft parameters 208, 212, 216, 220, 226 are subject to fluctuation at or near their respective parameter thresholds 236. For example, if the thrust command threshold is 25 percent and thrust command 226 is oscillating at or near 25 percent, it is undesirable for ground state determination module 234 to fluctuate between an on-ground and off-ground state determination in response to the fluctuation of thrust command 226. Thus, ground state monitoring module 232 may include a time module 238 to enforce a confirmation time period that prevents transient fluctuations in the aircraft parameters from affecting the ground state determination of ground state determination system 200. Time module 238 monitors the time persistence of any combination of aircraft parameters 208, 212, 216, 220, 226 and ground state determination module 234 may determine whether the aircraft is on a surface based at least partially on the time persistence of any combination of parameters 208, 212, 216, 220, 226 relative to their respective parameter thresholds 236. The time persistence at which a logic determination is confirmed may depend, for example, on the rate or frequency at which sensor data is being collected or received. In one non-limiting example, ground state determination module 234 may require a three-cycle persistence of any particular aircraft parameter to change a logic state so that one or two ticks or instances of bad or oscillating data will not cause a false logic determination. In one implementation of this example, ground state determination module 234 may require thrust command 226 to be less than the thrust command threshold for three cycles for an on-ground determination to be confirmed. Time persistence may also be measured or required in milliseconds or seconds.

In yet other embodiments, ground state monitoring module 232 monitors altitude 208, pitch 212, thrust command 226 and vertical acceleration 216 and ground state determination module 234 compares altitude 208 to an altitude threshold, pitch 212 to a pitch threshold, thrust command 226 to a thrust command threshold and vertical acceleration 216 to a vertical acceleration threshold. Ground state determination module 234 may then perform two determination steps related to one another by "OR" logic such that if either or both of the first or second determination steps determine that the aircraft is on a surface, ground state determination module 234 likewise makes a determination that the aircraft is on a surface. In the first determination step, ground state determination module 234 may compare altitude 208 to the altitude threshold and pitch 212 to the pitch threshold. In the second determination step, ground state determination module 234 may compare thrust command 226 to the thrust command threshold, vertical acceleration 216 to the vertical acceleration threshold and pitch 212 to the pitch threshold. A non-limiting example of such embodiments may be expressed as follows:

IF (altitude 208<altitude threshold AND pitch 212>pitch threshold)
    OR
    IF (thrust command 226<thrust command threshold AND vertical acceleration 216>vertical acceleration threshold AND pitch 212>pitch threshold)
    THEN
    Aircraft is on a surface.

In other embodiments, which may be used for aircraft such as helicopters that maintain a relatively stable pitch throughout its flight regime, ground state determination system 200 may dispense with the comparison between pitch 212 and a pitch threshold when determining whether the aircraft is on a surface. In such embodiments, ground state monitoring module 232 monitors altitude 208, thrust command 226 and vertical acceleration 216 and ground state determination module 234 compares altitude 208 to an altitude threshold, thrust command 226 to a thrust command threshold and vertical acceleration 216 to a vertical acceleration threshold. Ground state determination module 234 may implement two determination steps. In a first determination step, ground state determination module 234 may determine whether the aircraft is on a surface in response to comparing altitude 208 to the altitude threshold. In a second determination step, ground state determination module 234 may determine whether the aircraft is on a surface in response to comparing thrust command 226 to the thrust command threshold and vertical acceleration 216 to the vertical acceleration threshold. Ground state determination module 234 may determine that the aircraft is on a surface in response to either or both first or second determination steps determining that the aircraft is on a surface. A non-limiting example of such embodiments may be expressed as follows:

IF (altitude 208<altitude threshold)
    OR
    IF (thrust command 226<thrust command threshold AND vertical acceleration 216>vertical acceleration threshold)
    THEN
    Aircraft is on a surface.

In yet other embodiments, a third determination step may be added to determine whether the aircraft is on a surface in response to comparing pitch 212 to a pitch threshold and ground state determination module 234 may determine that the aircraft is on a surface in response to any one of the three determination steps determining that the aircraft is on a surface. Such a three-step determination logic may be useful for aircraft that change pitch to convert between forward flight and VTOL flight modes such as aircraft 10 shown in FIGS. 1A-1B. A non-limiting example of such embodiments may be expressed as follows:

IF (altitude 208<altitude threshold)
    OR
    IF (thrust command 226<thrust command threshold AND vertical acceleration 216>vertical acceleration threshold)
    OR
    IF (pitch 212>pitch threshold)
    THEN
    Aircraft is on a surface.

In the examples provided herein, the operators used in each expression, including mathematical, relational and logic operators, are reversible and generally interchangeable. For example, any "OR" operator may be replaced with an "AND" operator, or vice versa. Also, any "<" operator may be replaced with a ">" operator, or vice versa. Additionally, any "<" or ">" operator may be replaced with a "≤" or "≥" operator, respectively. Indeed, numerous permutations of the examples provided herein are within the scope of the illustrative embodiments. By dispensing with the need for dedicated proximity or weight switches and instead using inertial, altimeter and/or other aircraft parameters in a self-checking logic scheme, ground state determination system 200 provides a more reliable indicator of whether or not an aircraft is on a surface such as the ground. Also, because ground state determination system 200 may use sensors that are used on an aircraft for other purposes, ground state determination system 200 adds little or no weight or cost to the aircraft.

Referring additionally to FIGS. 5A-5I in the drawings, a sequential flight-operating scenario of aircraft 240 including ground state determination system 200 is depicted. Ground state determination system 200 is implemented in part by flight control system 222. As best seen in FIG. 5A, aircraft 240 is in a tailsitter position on a surface 242 such as the ground, a helipad or the deck of an aircraft carrier with landing feet 244 in contact with surface 242. When aircraft 240 is ready for a mission, flight control system 222 commences operations providing flight commands to the various components of aircraft 240. Flight control system 222 may be operating responsive to autonomous flight control, remote flight control or a combination thereof. For example, it may be desirable to utilize remote flight control during certain maneuvers such as takeoff and landing but rely on autonomous flight control during hover, high speed forward flight and transitions between wing-borne flight and thrust-borne flight. While ground state determination system 200 may be used to determine whether aircraft 240 is on surface 242 prior to takeoff, for sake of efficiency the operation of ground state determination system 200 is described herein in relation to determining whether aircraft 240 is on surface 242 during the landing phase of the flight regime. One having ordinary skill in the art, however, will fully appreciate an understanding of the operation of ground state determination system 200 prior to takeoff based upon the disclosure herein of the operation of ground state determination system 200 during landing.

As best seen in FIG. 5B, aircraft 240 has performed a vertical takeoff and is engaged in thrust-borne lift in the VTOL orientation of aircraft 240. As illustrated, the rotor assemblies of propulsion assemblies 246 are each rotating in substantially the same horizontal plane. In the illustrated embodiment, pitch angle 212 of aircraft 240 is the angle between reference axis 250 substantially parallel to propulsion assemblies 246 and a horizontal plane H that is normal to the local vertical in the earth's reference frame, although in other embodiments the pitch angle of aircraft 240 may be measured relative to other axes or planes such as the pitch or longitudinal axes of aircraft 240 described in FIGS. 1A-1B. In FIG. 5B, pitch angle 212 of aircraft 240 is approximately 90 degrees, indicating that aircraft 240 is in the VTOL orientation and has a level flight attitude. In the VTOL orientation, wing 252 is the forward wing and wing 254 is the aft wing. As discussed herein, flight control system 222 independently controls and operates each propulsion assembly 246 including independently controlling speed and thrust vector. During hover, flight control system 222 may utilize differential speed control and/or differential or collective thrust vectoring of propulsion assemblies 246 to provide hover stability for aircraft 240 and to provide pitch, roll, yaw and translation authority for aircraft 240.

After vertical ascent to the desired elevation, aircraft 240 may begin the transition from thrust-borne lift to wing-borne lift. As best seen from the progression of FIGS. 5B-5D, aircraft 240 is operable to pitch down from the VTOL orientation toward the biplane orientation to enable high speed and/or long range forward flight. As seen in FIG. 5C, pitch angle 212 of aircraft 240 is approximately 30 degrees such that aircraft 240 has an inclined flight attitude. Flight control system 222 may achieve this operation through speed control of some or all of propulsion assemblies 246, thrust vectoring of some or all of propulsion assemblies 246 or any combination thereof.

As best seen in FIGS. 5D and 5E, aircraft 240 has completed the transition to the biplane orientation with the rotor assemblies of propulsion assemblies 246 each rotating in substantially the same vertical plane. In the biplane orientation, wing 254 is the upper wing positioned above wing 252, which is the lower wing. Pitch angle 212 is approximately zero degrees as reference axis 250 is in horizontal plane H such that aircraft 240 has a level flight attitude in the biplane orientation. As forward flight with wing-borne lift requires significantly less power than VTOL flight with thrust-borne lift, the operating speed of some or all of the propulsion assemblies 246 may be reduced. In certain embodiments, some of the propulsion assemblies of aircraft 240 could be shut down during forward flight. In the biplane orientation, the independent control provided by flight control system 222 over each propulsion assembly 246 provides pitch, roll and yaw authority for aircraft 240.

As aircraft 240 approaches the desired location, aircraft 240 may begin its transition from wing-borne lift to thrust-borne lift. As best seen from the progression of FIGS. 5E-5G, aircraft 240 is operable to pitch up from the biplane orientation to the VTOL orientation to enable, for example, a vertical landing operation. As seen in FIG. 5F, pitch angle 212 is approximately 30 degrees such that aircraft 240 has an inclined flight attitude of about 30 degrees pitch up. Flight control system 222 may achieve this operation through speed control of some or all of propulsion assemblies 246, thrust vectoring of some or all of propulsion assemblies 246 or any combination thereof. In FIG. 5G, aircraft 240 has completed the transition from the biplane orientation to the VTOL orientation and pitch angle 212 is approximately 90 degrees such that aircraft 240 has a level flight attitude in the VTOL orientation.

Once aircraft 240 has completed the transition to the VTOL orientation, aircraft 240 may hover and commence its vertical descent to surface 242. FIG. 5H shows aircraft 240 several feet above surface 242 prior to landing and FIG. 5I shows aircraft 240 landed on surface 242. Ground state determination system 200 monitors various parameters of aircraft 240 and compares such parameters to respective parameter thresholds to determine whether aircraft 240 is on surface 242. In some embodiments, ground state determination system 200 determines whether aircraft 240 is on surface 242 based on two separate determination processes that each use different combinations of aircraft parameters. If either or both of the two determination processes determine that aircraft 240 is on surface 242, then ground state determination system 200 likewise makes a determination that aircraft 240 is surface 242. A first example of one of the two determination processes that may be used by ground state determination system 200 utilizes altitude 208 and pitch 212 of aircraft 240. In particular, ground state determination system 200 may compare altitude 208 to altitude threshold 258, which may be on the order of microns, millimeters, feet or meters, and pitch 212 to a pitch threshold such as a pitch threshold in a range between 30 degrees and 60 degrees by determining whether altitude 208 is less than altitude threshold 258 and pitch 212 exceeds the pitch threshold. In this non-limiting example, even though pitch 212 may exceed the pitch threshold in both FIGS. 5H and 5I, ground state determination system 200 may determine that aircraft 240 on surface 242 in FIG. 5I but not in FIG. 5H since altitude 208 is less than altitude threshold 258 only in FIG. 5I. A second example of one of the two determination processes that may be used by ground state determination system 200 utilizes the thrust command(s) to propulsion assemblies 246, the vertical acceleration of aircraft 240 and pitch 212 of aircraft 240. In particular, ground state determination system 200 may compare the thrust command to a thrust command threshold such as a thrust command threshold in a range between 10 percent and 40 percent of hover power thrust, the vertical acceleration to a vertical acceleration threshold such as a vertical acceleration threshold equal to or less than zero and pitch 212 to a pitch threshold such as 45 degrees by determining whether the thrust command is less than the thrust command threshold, the vertical acceleration exceeds the vertical acceleration threshold and pitch 212 exceeds the pitch threshold. In this non-limiting example, even though pitch 212 may exceed the pitch threshold in both FIGS. 5H and 5I, the determination of whether or not aircraft 240 is on surface 242 will depend on the thrust command to propulsion assemblies 246 and the vertical acceleration of aircraft 240 in each of these figures as well as the benchmarks set by the thrust command threshold and the vertical acceleration threshold. In other embodiments, one, three or more determination processes may be used to determine whether aircraft 240 is on surface 242 and such processes may be linked by "AND", "OR" or other logic in making an on-ground determination. Other combinations of aircraft parameters may be used in such processes. Once aircraft 240 has landed as shown in FIG. 5I, aircraft 242 rests in its tailsitter orientation at the selected landing site.

Figure 6A:
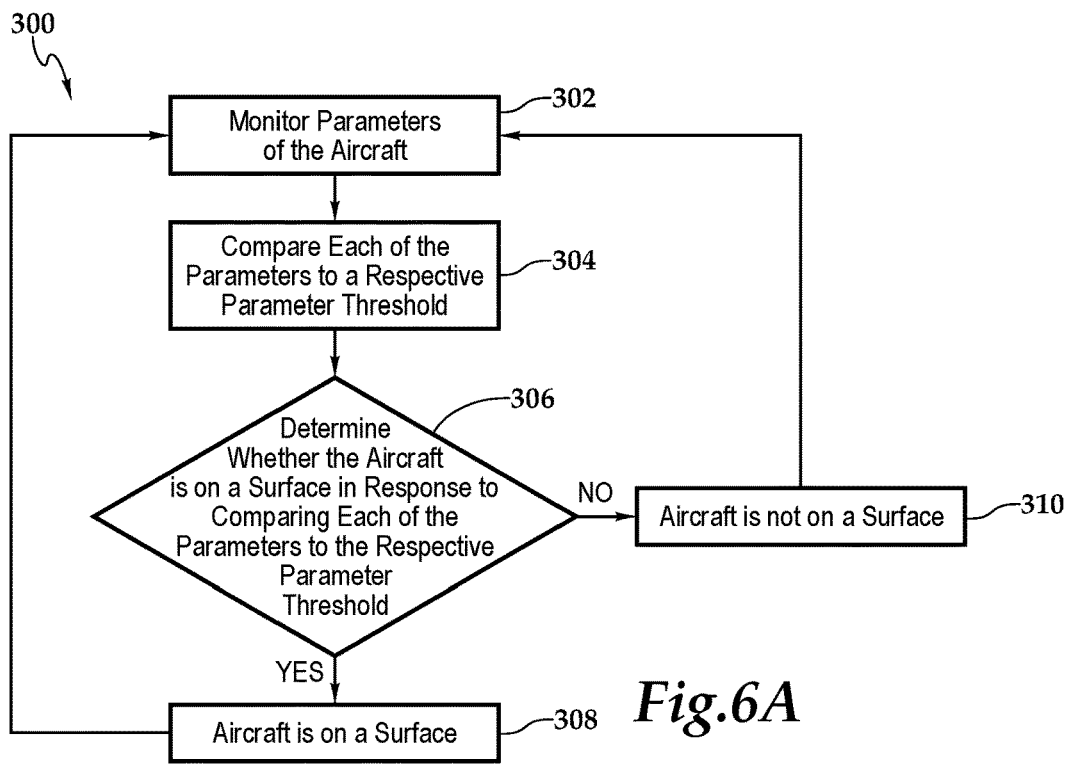
FIGS. 6A-6D are flowcharts of various methods for determining a ground state of an aircraft in accordance with embodiments of the present disclosure.
Figure 6B:
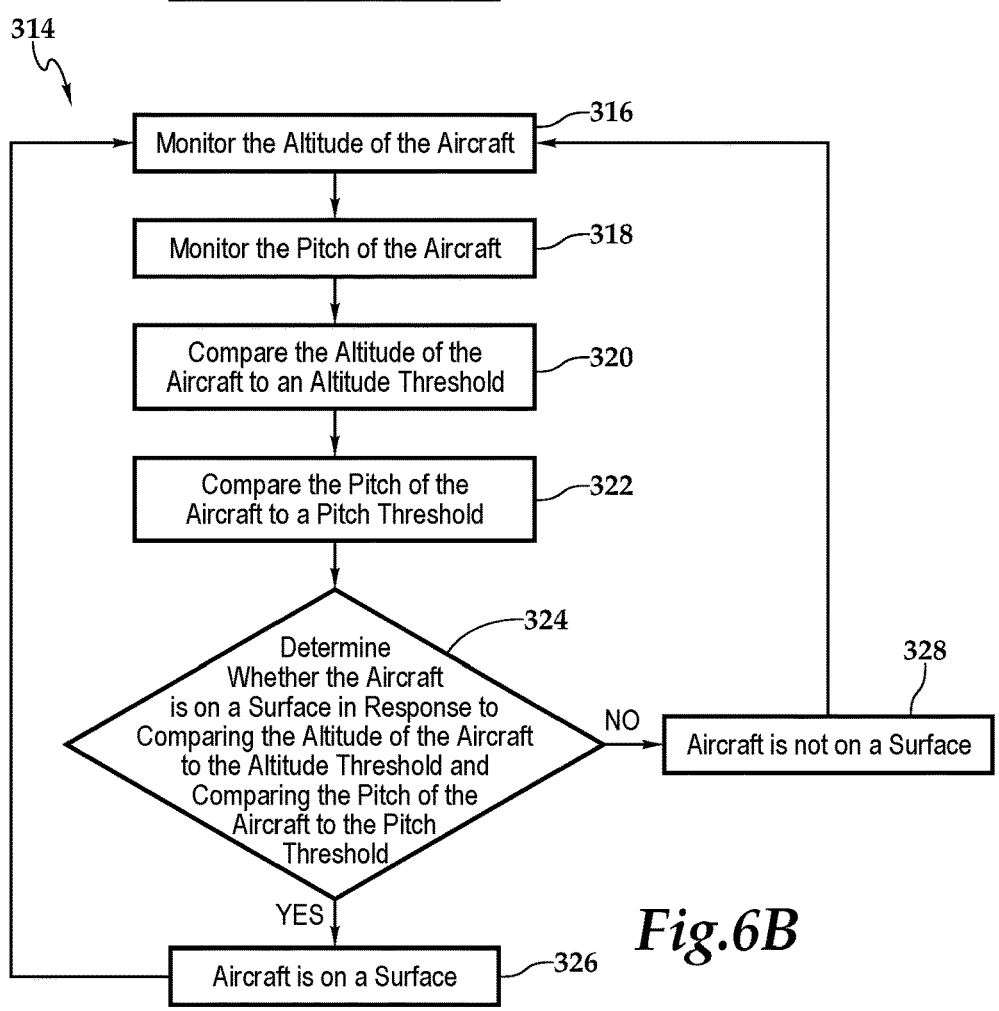

Referring to FIGS. 6A-6D in the drawings, various methods for determining whether an aircraft is on a surface are depicted. In FIG. 6A, method 300 includes monitoring parameters of the aircraft (step 302) and comparing each of the parameters to a respective parameter threshold (step 304). Method 300 includes determining whether the aircraft is on a surface in response to comparing each of the parameters to the respective parameter threshold (step 306). If, in comparing each of the parameters to their respective parameter thresholds, method 300 determines that the aircraft is on a surface, then the aircraft is on a surface (step 308). If, in comparing each of the parameters to their respective parameter threshold, method 300 determines that the aircraft is not on a surface, then the aircraft is not on a surface (step 310). After the on-ground determination is executed, method 300 may loop back to any previous step such as step 302 to continue evaluating the on-ground state of the aircraft. In FIG. 6B, method 314 includes monitoring the altitude of the aircraft (step 316) and monitoring the pitch of the aircraft (step 318). Method 314 also includes comparing the altitude of the aircraft to an altitude threshold (step 320) and comparing the pitch of the aircraft to a pitch threshold (step 322). Method 314 includes determining whether the aircraft is on a surface in response to comparing the altitude of the aircraft to the altitude threshold and comparing the pitch of the aircraft to the pitch threshold (step 324). If, in comparing the altitude of the aircraft to the altitude threshold and comparing the pitch of the aircraft to the pitch threshold, method 314 determines that the aircraft is on a surface, then the aircraft is on a surface (step 326). If, in comparing the altitude of the aircraft to the altitude threshold and comparing the pitch of the aircraft to the pitch threshold, method 314 determines that the aircraft is not on a surface, then the aircraft is not on a surface (step 328). After the on-ground determination is executed, method 314 may loop back to any previous step such as step 316 to continue evaluating the on-ground state of the aircraft.

Figure 6C:
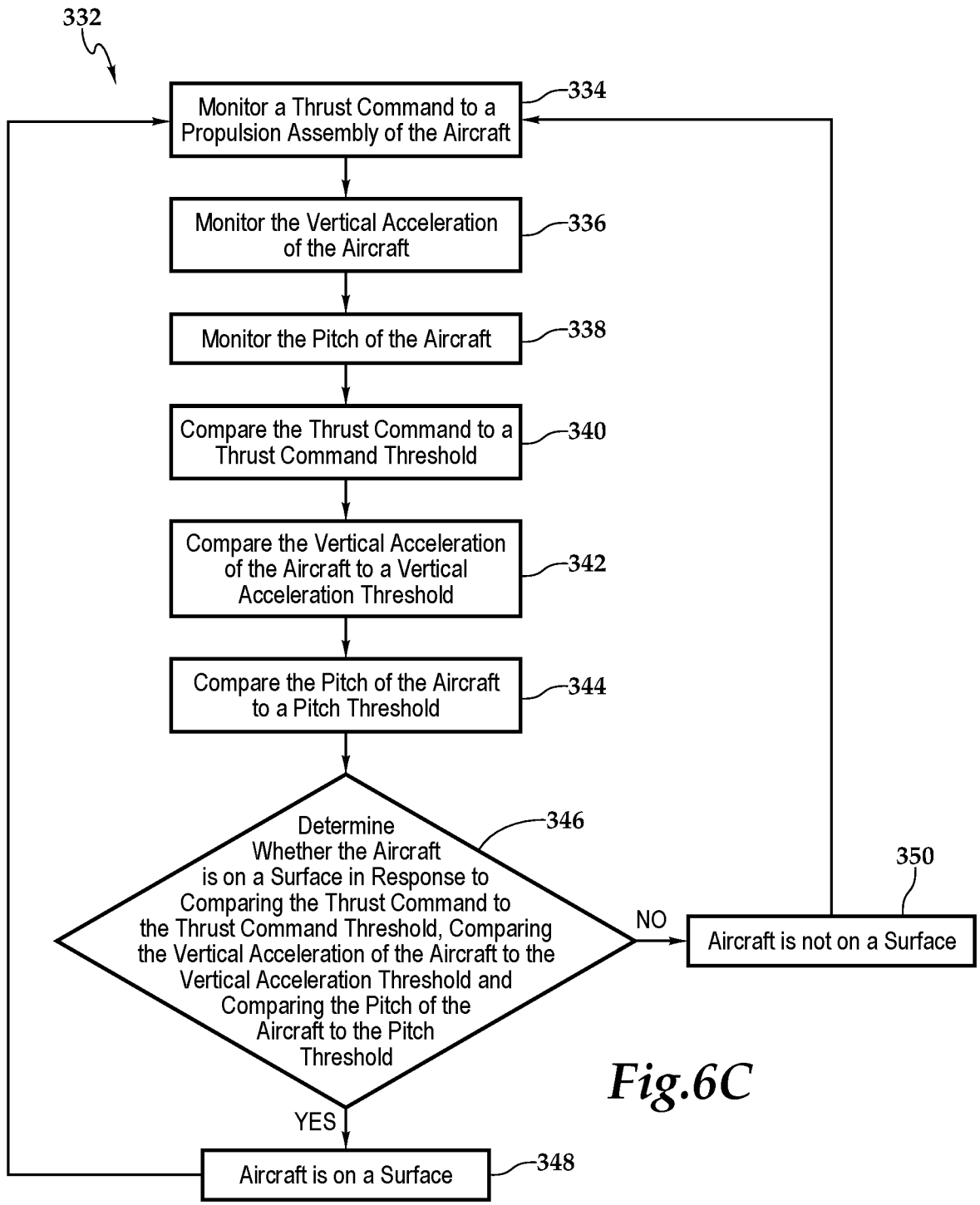

In FIG. 6C, method 332 includes monitoring a thrust command to a propulsion assembly of the aircraft (step 334), monitoring the vertical acceleration of the aircraft (step 336) and monitoring the pitch of the aircraft (step 338). Method 332 also includes comparing the thrust command to a thrust command threshold (step 340), comparing the vertical acceleration of the aircraft to a vertical acceleration threshold (step 342) and comparing the pitch of the aircraft to a pitch threshold (step 344). Method 332 includes determining whether the aircraft is on a surface in response to comparing the thrust command to the thrust command threshold, comparing the vertical acceleration of the aircraft to the vertical acceleration threshold and comparing the pitch of the aircraft to the pitch threshold (step 346). If, in comparing the thrust command to the thrust command threshold, comparing the vertical acceleration of the aircraft to the vertical acceleration threshold and comparing the pitch of the aircraft to the pitch threshold, method 332 determines that the aircraft is on a surface, then the aircraft is on a surface (step 348). If, in comparing the thrust command to the thrust command threshold, comparing the vertical acceleration of the aircraft to the vertical acceleration threshold and comparing the pitch of the aircraft to the pitch threshold, method 332 determines that the aircraft is not on a surface, then the aircraft is not on a surface (step 350). After the on-ground determination is executed, method 332 may loop back to any previous step such as step 334 to continue evaluating the on-ground state of the aircraft.

Figure 6D:
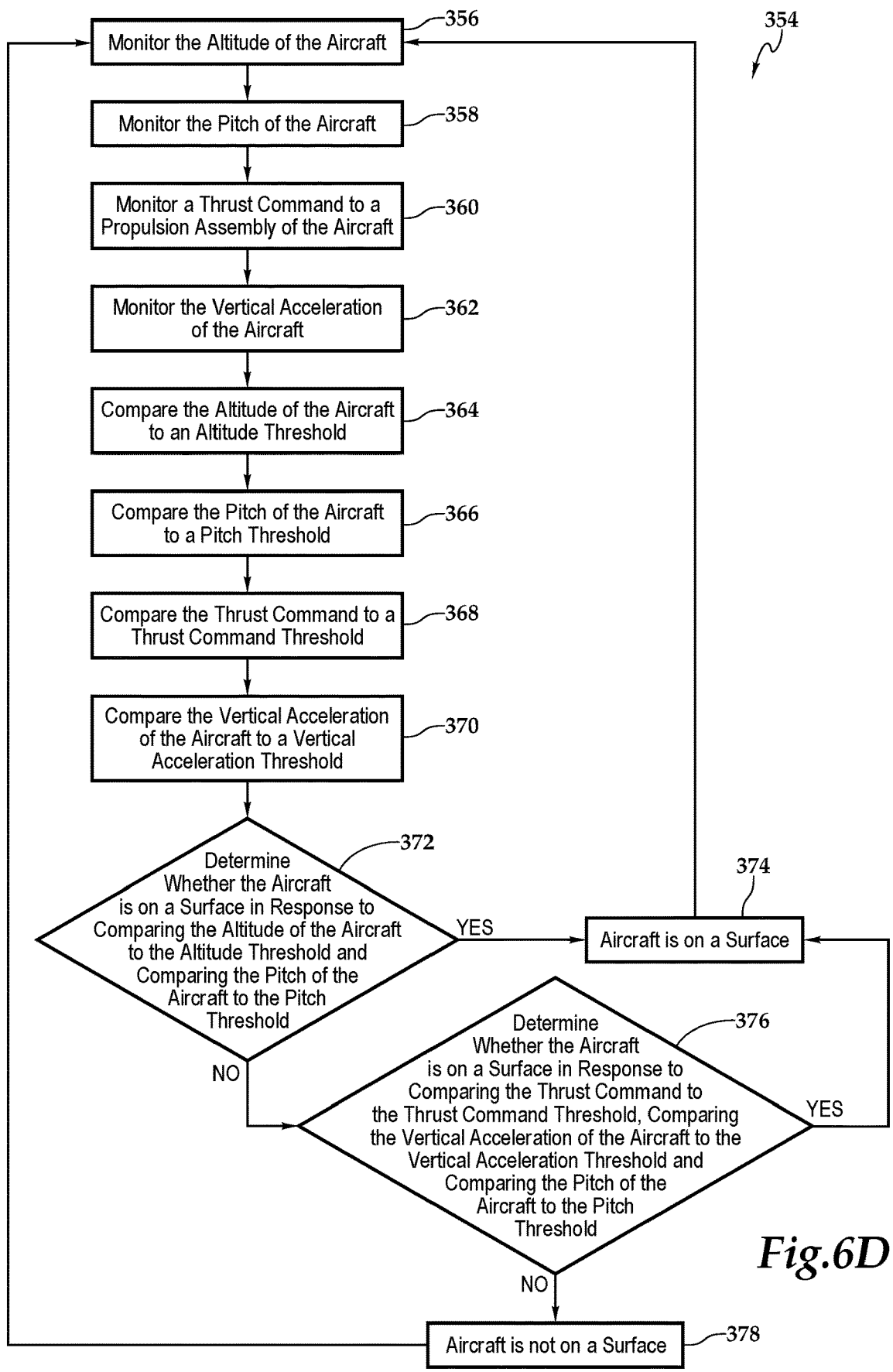

In FIG. 6D, method 354 includes monitoring the altitude of the aircraft (step 356), monitoring the pitch of the aircraft (step 358), monitoring a thrust command to a propulsion assembly of the aircraft (step 360) and monitoring the vertical acceleration of the aircraft (step 362). Method 354 also includes comparing the altitude of the aircraft to an altitude threshold (step 364), comparing the pitch of the aircraft to a pitch threshold (step 366), comparing the thrust command to a thrust command threshold (step 368) and comparing the vertical acceleration of the aircraft to a vertical acceleration threshold (step 370). Method 354 includes determining whether the aircraft is on a surface in response to comparing the altitude of the aircraft to the altitude threshold and comparing the pitch of the aircraft to the pitch threshold (step 372). If, in comparing the altitude of the aircraft to the altitude threshold and comparing the pitch of the aircraft to the pitch threshold, method 354 determines that the aircraft is on a surface, then the aircraft is on a surface (step 374). If, in comparing the altitude of the aircraft to the altitude threshold and comparing the pitch of the aircraft to the pitch threshold, method 354 determines that the aircraft is not on a surface, then method 354 determines whether the aircraft is on a surface in response to comparing the thrust command to the thrust command threshold, comparing the vertical acceleration of the aircraft to the vertical acceleration threshold and comparing the pitch of the aircraft to the pitch threshold (step 376). If, in comparing the thrust command to the thrust command threshold, comparing the vertical acceleration of the aircraft to the vertical acceleration threshold and comparing the pitch of the aircraft to the pitch threshold, method 354 determines that the aircraft is on a surface, then the aircraft is on a surface (step 374). If, in comparing the thrust command to the thrust command threshold, comparing the vertical acceleration of the aircraft to the vertical acceleration threshold and comparing the pitch of the aircraft to the pitch threshold, method 354 determines that the aircraft is not on a surface, then the aircraft is not on a surface (step 378). Determination steps 372 and 376 may be performed in any order or simultaneously. After the on-ground determination is executed, method 354 may loop back to any previous step such as step 356 to continue evaluating the on-ground state of the aircraft.

Figure 7A:
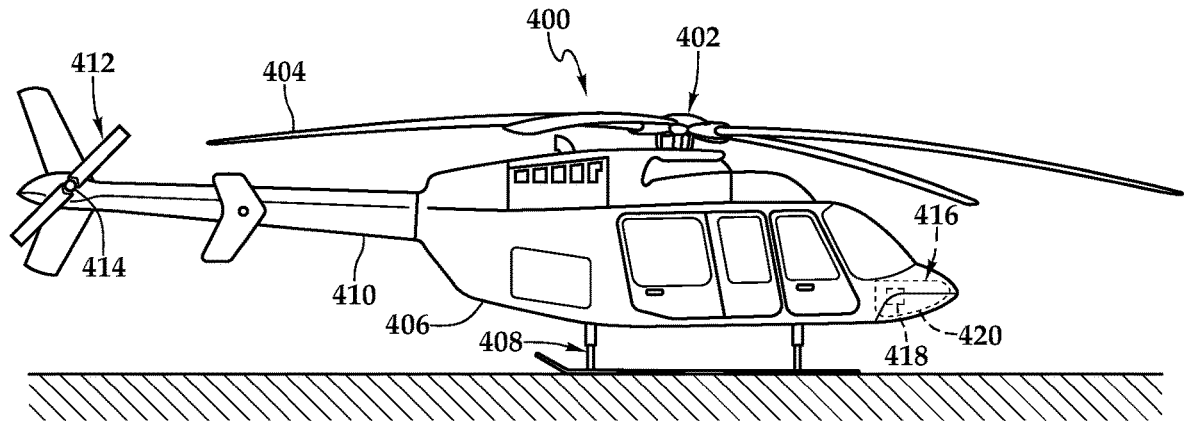
FIGS. 7A-7B are schematic illustrations of a helicopter having a ground state determination system in accordance with embodiments of the present disclosure.
Figure 7B:
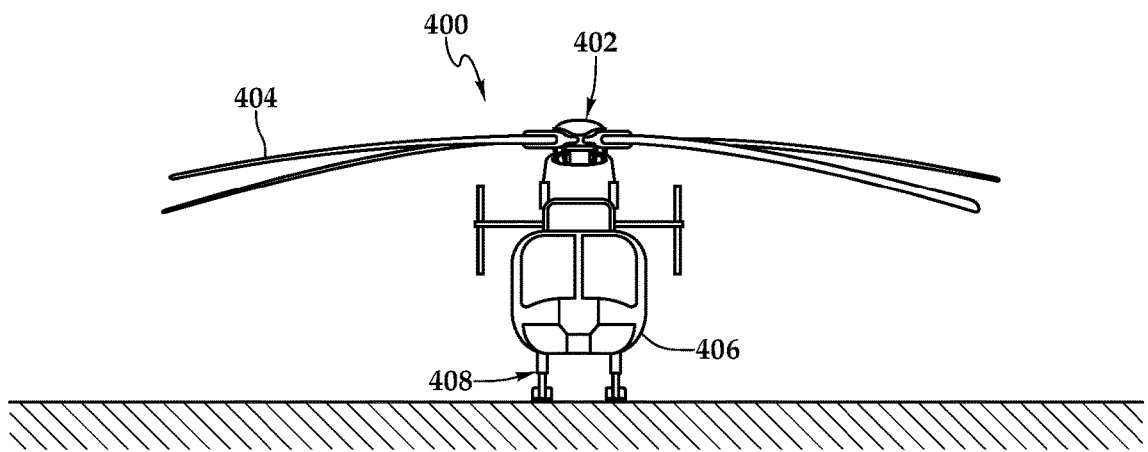

Referring to FIGS. 7A-7B in the drawings, a helicopter is schematically illustrated and generally designated 400. Helicopter 400 includes a rotor hub assembly 402, which includes a plurality of rotor blade assemblies 404. Rotor hub assembly 402 is rotatable relative to a fuselage 406 of helicopter 400. The pitch of rotor blade assemblies 404 can be collectively and/or cyclically manipulated to selectively control direction, thrust and lift of helicopter 400. A landing gear system 408 including skids provides ground support for helicopter 400. A tailboom 410 extends from fuselage 406. A tail rotor 412 includes a tail rotor hub assembly 414 that is rotatably coupled to the aft portion of tailboom 410.

Helicopter 400 includes a ground state determination system 416 configured to determine whether helicopter 400 is on a surface. Ground state determination system 416 includes a ground state module 418 implemented by flight control system 420 that monitors a combination of aircraft parameters such as above ground level (AGL) altitude, vertical acceleration, vertical velocity and/or motor commands from one or more onboard sensors and compares such aircraft parameters to respective parameter thresholds to determine whether helicopter 400 is on a surface such as the ground. Since helicopter 400 is not a tailsitter aircraft and is not required to change pitch between forward flight and VTOL flight modes when landing, the pitch of helicopter 400 is a less relevant factor for ground state determination system 416 when determining whether helicopter 400 is on a surface. Thus, the processes and logic used by ground state determination system 416 to determine the on-ground state of helicopter 400 may dispense with pitch as an operand altogether. Helicopter 400 is illustrative of the wide variety of aircraft types that may utilize the ground state determination systems of the illustrative embodiments.

Referring additionally to FIGS. 8A-8F in the drawings, a sequential flight operating scenario of helicopter 400 using ground state determination system 416 is depicted. As best seen in FIG. 8A, helicopter 400 is positioned on surface 422 prior to takeoff. When helicopter 400 is ready for a mission, flight control system 420 commences operations to provide flight control to helicopter 400 which may be onboard pilot flight control, remote flight control, autonomous flight control or a combination thereof. For example, it may be desirable to utilize onboard pilot flight control during certain maneuvers such as takeoff and landing but rely on autonomous flight control during hover and/or forward flight. In FIG. 8B, helicopter 400 has lifted off from landing surface 422. In FIGS. 8C and 8D, helicopter 400 has gained altitude. In FIG. 8E, helicopter 400 enters the landing phase as it begins to vertically descend onto surface 422.

Ground state determination system 416 monitors various parameters of helicopter 400 and compares such parameters to respective parameter thresholds to determine whether helicopter 400 is on surface 422. In some embodiments, ground state determination system 416 determines whether helicopter 400 is on surface 422 based on two separate determination processes that each use different combinations of aircraft parameters. If either or both of the two determination processes determine that helicopter 400 is on surface 422, then ground state determination system 416 likewise makes a determination that helicopter 400 is on surface 422. A first example of one of the two determination processes that may be used by ground state determination system 416 utilizes altitude 424 of helicopter 400. In particular, ground state determination system 416 may compare altitude 424 to altitude threshold 426, which may be on the order of microns, millimeters, feet or meters, by determining whether altitude 424 is less than altitude threshold 426. In this non-limiting example, ground state determination system 416 may determine that helicopter 400 is on surface 422 in FIG. 8F but not in FIG. 8E since altitude 424 is less than altitude threshold 426 only in FIG. 8F. A second example of one of the two determination processes that may be used by ground state determination system 416 utilizes the thrust command(s) to rotor hub assembly 402 and the vertical acceleration of helicopter 400. In particular, ground state determination system 416 may compare the thrust command to a thrust command threshold such as a thrust command threshold in a range between 10 percent and 40 percent of full hover power thrust and the vertical acceleration to a vertical acceleration threshold such as a vertical acceleration threshold equal to or less than zero by determining whether the thrust command is less than the thrust command threshold and the vertical acceleration exceeds the vertical acceleration threshold. In this non-limiting example, the determination of whether or not helicopter 400 is on surface 422 will depend on the thrust command to rotor hub assembly 402 and the vertical acceleration of helicopter 400 as well as the benchmarks set by the thrust command threshold and the vertical acceleration threshold. In other embodiments, one, three or more determination processes may be used to determine whether helicopter 400 is on surface 422 and such processes may be linked by "AND", "OR" or other logic in making an on-ground determination. Other combinations of aircraft parameters may be used in such process(es).

Figure 9:
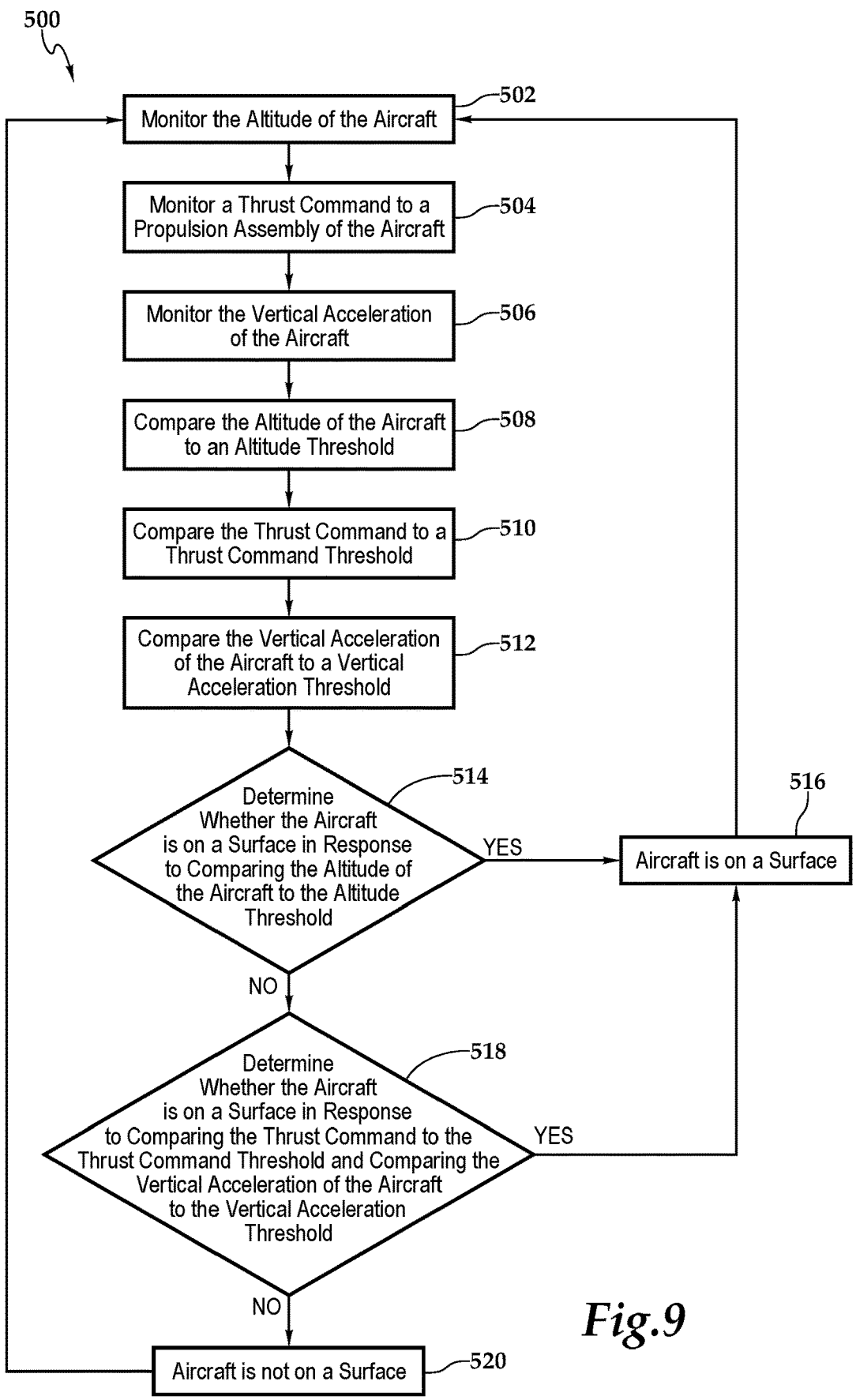
FIG. 9 is a flowchart of a method for determining a ground state of a helicopter or other VTOL aircraft in accordance with embodiments of the present disclosure.

Referring to FIG. 9 in the drawings, a method for determining whether an aircraft such as helicopter 400 is on a surface is depicted and generally designated 500. Method 500 includes monitoring the altitude of the aircraft (step 502), monitoring a thrust command to a propulsion assembly of the aircraft (step 504) and monitoring the vertical acceleration of the aircraft (step 506). Method 500 also includes comparing the altitude of the aircraft to an altitude threshold (step 508), comparing the thrust command to a thrust command threshold (step 510) and comparing the vertical acceleration of the aircraft to a vertical acceleration threshold (step 512). Method 500 includes determining whether the aircraft is on a surface in response to comparing the altitude of the aircraft to the altitude threshold (step 514). If, in comparing the altitude of the aircraft to the altitude threshold, method 500 determines that the aircraft is on a surface, then the aircraft is on a surface (step 516). If, in comparing the altitude of the aircraft to the altitude threshold, method 500 determines that the aircraft is not on a surface, then method 500 determines whether the aircraft is on a surface in response to comparing the thrust command to the thrust command threshold and comparing the vertical acceleration of the aircraft to the vertical acceleration threshold (step 518). If, in comparing the thrust command to the thrust command threshold and comparing the vertical acceleration of the aircraft to the vertical acceleration threshold, method 500 determines that the aircraft is on a surface, then the aircraft is on a surface (step 516). If, in comparing the thrust command to the thrust command threshold and comparing the vertical acceleration of the aircraft to the vertical acceleration threshold, method 500 determines that the aircraft is not on a surface, then the aircraft is not on a surface (step 520). Determination steps 514 and 518 may be performed in any order or simultaneously. After the on-ground determination is executed, method 500 may loop back to any previous step such as step 502 to continue evaluating the on-ground state of the aircraft.

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. A ground state determination system for a tailsitter aircraft convertible between a forward flight orientation and a vertical takeoff and landing (VTOL) orientation, the ground state determination system comprising:
 a plurality of sensors configured to detect a plurality of parameters of the tailsitter aircraft, the plurality of sensors including an attitude sensor to detect a pitch of the tailsitter aircraft, a distance sensor to detect an altitude of the tailsitter aircraft and an accelerometer to detect a vertical acceleration of the tailsitter aircraft; and
 a flight control computer including one or more processors implementing a ground state module, the flight control computer comprising:
 a thrust command module including at least a portion of the one or more processors of the flight control computer to provide a thrust command to a propulsion assembly of the tailsitter aircraft;
 a ground state monitoring module including at least a portion of the one or more processors of the flight control computer to monitor the parameters including the pitch of the tailsitter aircraft, the altitude of the tailsitter aircraft, the thrust command to the propulsion assembly of the tailsitter aircraft and the vertical acceleration of the tailsitter aircraft; and
 a ground state determination module including at least a portion of the one or more processors of the flight control computer to compare each of the parameters monitored by the ground state monitoring module to a respective parameter threshold including comparing the pitch of the tailsitter aircraft to a pitch threshold, comparing the altitude of the tailsitter aircraft to an altitude threshold, comparing the thrust command to a thrust command threshold and comparing the vertical acceleration of the tailsitter aircraft to a vertical acceleration threshold, the ground state determination module determining in a first determination operation whether the tailsitter aircraft is on a surface in response to comparing the altitude of the tailsitter aircraft to the altitude threshold and comparing the pitch of the tailsitter aircraft to the pitch threshold and determining in a second determination operation whether the tailsitter aircraft is on the surface in response to comparing the thrust command to the thrust command threshold, comparing the vertical acceleration of the tailsitter aircraft to the vertical acceleration threshold and comparing the pitch of the tailsitter aircraft to the pitch threshold;
 wherein, the ground state determination module determines that the tailsitter aircraft is on the surface in response to at least one of the first determination operation or the second determination operation determining that the tailsitter aircraft is on the surface.

2. The ground state determination system as recited in claim 1 wherein the sensors include a velocity sensor to detect a vertical velocity of the tailsitter aircraft, the parameters monitored by the ground state monitoring module including the vertical velocity of the tailsitter aircraft; and
 wherein, the one or more processors implement the ground state determination module to compare the vertical velocity of the tailsitter aircraft to a vertical velocity threshold, thereby determining whether the tailsitter aircraft is on the surface based at least partially on the vertical velocity of the tailsitter aircraft.

3. The ground state determination system as recited in claim 1 wherein the ground state monitoring module further comprises a time module including at least a portion of the one or more processors of the flight control computer to monitor time persistence of the parameters; and
 wherein, the one or more processors implement the ground state determination module to determine whether the tailsitter aircraft is on the surface based at least partially on the time persistence of the parameters.

4. A tailsitter aircraft convertible between a forward flight orientation and a vertical takeoff and landing (VTOL) orientation, the tailsitter aircraft comprising:
 a fuselage;
 a plurality of sensors configured to detect a plurality of parameters of the tailsitter aircraft, the plurality of sensors including an attitude sensor to detect a pitch of the tailsitter aircraft, a distance sensor to detect an altitude of the tailsitter aircraft and an accelerometer to detect a vertical acceleration of the tailsitter aircraft; and
 a flight control computer including one or more processors in communication with the sensors, the flight control computer implementing a ground state module, the flight control computer comprising:
 a thrust command module including at least a portion of the one or more processors of the flight control computer to provide a thrust command to a propulsion assembly of the tailsitter aircraft;
 a ground state monitoring module including at least a portion of the one or more processors of the flight control computer to monitor the parameters including the pitch of the tailsitter aircraft, the altitude of the tailsitter aircraft, the thrust command to the propulsion assembly of the tailsitter aircraft and the vertical acceleration of the tailsitter aircraft; and
 a ground state determination module including at least a portion of the one or more processors of the flight control computer to compare each of the parameters monitored by the ground state monitoring module to a respective parameter threshold including comparing the pitch of the tailsitter aircraft to a pitch threshold, comparing the altitude of the tailsitter aircraft to an altitude threshold, comparing the thrust command to a thrust command threshold and comparing the vertical acceleration of the tailsitter aircraft to a vertical acceleration threshold, the ground state determination module determining in a first determination operation whether the tailsitter aircraft is on a surface in response to comparing the altitude of the tailsitter aircraft to the altitude threshold and comparing the pitch of the tailsitter aircraft to the pitch threshold and determining in a second determination operation whether the tailsitter aircraft is on the surface in response to comparing the thrust command to the thrust command threshold, comparing the vertical acceleration of the tailsitter aircraft to the vertical acceleration threshold and comparing the pitch of the tailsitter aircraft to the pitch threshold;

wherein, the ground state determination module determines that the tailsitter aircraft is on the surface in response to at least one of the first determination operation or the second determination operation determining that the tailsitter aircraft is on the surface.

5. A flight control computer-implemented method for determining a ground state of a tailsitter aircraft convertible between a forward flight orientation and a vertical takeoff and landing (VTOL) orientation, the method comprising:

monitoring, using one or more processors of the flight control computer, a plurality of parameters of the tailsitter aircraft including a pitch of the tailsitter aircraft, an altitude of the tailsitter aircraft, a thrust command to a propulsion assembly of the tailsitter aircraft and a vertical acceleration of the tailsitter aircraft;

comparing, using the one or more processors of the flight control computer, each of the parameters of the tailsitter aircraft to a respective parameter threshold including comparing the pitch of the tailsitter aircraft to a pitch threshold, comparing the altitude of the tailsitter aircraft to an altitude threshold, comparing the thrust command to a thrust command threshold and comparing the vertical acceleration of the tailsitter aircraft to a vertical acceleration threshold; and determining, using the one or more processors of the flight control computer, whether the tailsitter aircraft is on a surface, the determining step comprising:

a first determination step determining, using the one or more processors of the flight control computer, whether the tailsitter aircraft is on the surface in response to comparing the altitude of the tailsitter aircraft to the altitude threshold and comparing the pitch of the tailsitter aircraft to the pitch threshold; and a second determination step determining, using the one or more processors of the flight control computer, whether the tailsitter aircraft is on the surface in response to comparing the thrust command to the thrust command threshold, comparing the vertical acceleration of the tailsitter aircraft to the vertical acceleration threshold and comparing the pitch of the tailsitter aircraft to the pitch threshold;

wherein, determining whether the tailsitter aircraft is on the surface further comprises determining, using the one or more processors of the flight control computer, that the tailsitter aircraft is on the surface in response to at least one of the first determination step or the second determination step determining that the tailsitter aircraft is on the surface.

6. The flight control computer-implemented method as recited in claim 5 wherein monitoring the parameters comprises monitoring, using the one or more processors of the flight control computer, parameters selected from the group consisting of the thrust command, the altitude of the tailsitter aircraft, the pitch of the tailsitter aircraft, the vertical acceleration of the tailsitter aircraft and a vertical velocity of the tailsitter aircraft.

7. The flight control computer-implemented method as recited in claim 5 wherein determining whether the tailsitter aircraft is on the surface comprises determining, using the one or more processors of the flight control computer, that the tailsitter aircraft is on the surface in response to the altitude of the tailsitter aircraft being less than the altitude threshold.

8. The flight control computer-implemented method as recited in claim 5 wherein the pitch threshold is in a range between 30 degrees and 60 degrees.

9. The flight control computer-implemented method as recited in claim 5 wherein determining whether the tailsitter aircraft is on the surface comprises determining, using the one or more processors of the flight control computer, that the tailsitter aircraft is on the surface in response to the thrust command being less than the thrust command threshold and the vertical acceleration of the tailsitter aircraft exceeding the vertical acceleration threshold.

10. The flight control computer-implemented method as recited in claim 5 wherein the thrust command threshold is in a range between 10 percent and 40 percent of hover power thrust.

11. The flight control computer-implemented method as recited in claim 5 wherein the vertical acceleration threshold is equal to or less than zero.

* * * * *